(12) United States Patent
Hansson et al.

(10) Patent No.: US 8,577,913 B1
(45) Date of Patent: Nov. 5, 2013

(54) GENERATING MIDSTRING QUERY REFINEMENTS

(75) Inventors: Othar Hansson, Sunnyvale, CA (US); James Home, San Francisco, CA (US); Anwis Das, Sunnyvale, CA (US); Michael Levin, Mountain View, CA (US); Abhinandan Das, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 161 days.

(21) Appl. No.: 13/118,196

(22) Filed: May 27, 2011

(51) Int. Cl.
  *G06F 17/30* (2006.01)
  *G06F 3/048* (2013.01)
(52) U.S. Cl.
  USPC .......................... 707/767; 707/768; 715/856
(58) Field of Classification Search
  CPC ................................. G06F 17/30646
  USPC ................... 707/767, 768; 715/856
  See application file for complete search history.

(56) References Cited

U.S. PATENT DOCUMENTS

| | | | |
|---|---|---|---|
| 7,487,145 B1 | 2/2009 | Gibbs et al. | |
| 7,917,528 B1 | 3/2011 | Dave et al. | |
| 2007/0162422 A1* | 7/2007 | Djabarov | 707/2 |
| 2009/0287680 A1 | 11/2009 | Paek et al. | |
| 2010/0010977 A1* | 1/2010 | Choi et al. | 707/4 |
| 2012/0117102 A1 | 5/2012 | Meyerzon et al. | |

* cited by examiner

*Primary Examiner* — Rehana Perveen
*Assistant Examiner* — Scott A Waldron
(74) *Attorney, Agent, or Firm* — Morgan, Lewis & Bockius LLP

(57) ABSTRACT

A system and method is provided for providing query suggestions, particularly midstring query completions for an original query being edited or hovered over. An original query is received from a client. One or more segments in the original query are identified including an anchor segment and zero or more remaining segments. The anchor segment is identified based on cursor placement within the original query. Then one or more sibling segments associated with the anchor segment are identified. The sibling segments are identified by the server system to be semantically distinct from anchor segment. Then one or more query refinement candidates are identified. A respective query refinement candidate includes a sibling segment in place of the anchor segment and includes the remaining segments, if any, of the original query. Then information including one or more of the query refinement candidates is sent to the client for presentation.

24 Claims, 14 Drawing Sheets

Query Refinements Database 232

Original Query 1102: <iceland hiking trails>

| Anchor Segment | Subsequent Query | Frequency |
|---|---|---|
| <Iceland> | <Reykjavik hiking trails> | 100,000 |
|  | <Denmark hiking trails> | 80,000 |
|  | <Finland hiking trails> | 60,000 |
|  | <world map hiking trails> | 1,000 |
| ... | ... | ... |
| <hiking> | <Iceland map trails> | 90,000 |
|  | <Iceland walking trails> | 40,000 |
|  | <Iceland outdoor trails> | 30,000 |
|  | <Iceland backpacking trails> | 10,000 |
| ... | ... | ... |
| <-> | <YouTube> | 100,100 |
|  | <Reykjavik hiking trails> | 100,000 |
|  | <gmail> | 98,000 |
|  | ... | ... |

Figure 11A

Original Query 1136: <Apple>

| Anchor Segment | Subsequent Query | Frequency |
|---|---|---|
| <Apple> | <banana> | 100,000 |
|  | <Google> | 80,000 |
|  | <IBM> | 70,000 |
|  | <strawberry> | 60,000 |
|  | <Golden Delicious> | 9,000 |
|  | ... | ... |

Figure 11B

Historical Queries Database 234

| Query | Frequency | |
|---|---|---|
| <You Tube> | 100,000,000,000 | 1206 |
| ⋮ | ⋮ | |
| <Amazon> | 90,000,000,000 | 1208 |
| ⋮ | ⋮ | |
| <Apple stock price> | 700,000,000 | 1210 |
| ⋮ | ⋮ | |
| <Denmark hiking trails> | 600,000 | 1212 |
| ⋮ | ⋮ | |
| <Iceland backpacking trails> | 100,000 | 1214 |
| ⋮ | ⋮ | |
| <banana stock price> | 89 | 1216 |
| ⋮ | ⋮ | |

1202 — Query
1204 — Frequency

Figure 12

GENERATING MIDSTRING QUERY REFINEMENTS

RELATED APPLICATIONS

This application is related to "Midstring Autocomplete," U.S. patent application Ser. No. 13/118,227, filed May 27, 2011, which is incorporated by reference herein in its entirety.

TECHNICAL FIELD

The present invention relates generally to the field of search engines for locating documents in a computer network (e.g., a distributed system of computer systems), and in particular, to a system and method for speeding up a desired search by anticipating a user's request.

BACKGROUND

Search engines provide a powerful tool for locating documents in a large database of documents, such as the documents on the World Wide Web (WWW) or the documents stored on the computers of an Intranet. The documents are located in response to a search query submitted by a user. A search query may consist of one or more search terms.

In one approach to entering queries, the user enters the query by adding successive search terms until all search terms are entered. Once the user signals that all of the search terms of the query have been entered, the query is sent to the search engine. The user may have alternative ways of signaling completion of the query by, for example, entering a return character, by pressing the enter key on a keyboard or by clicking on a "search" button on a graphical user interface. Once the query is received by the search engine, it processes the search query, searches for documents responsive to the search query, and returns a list of documents to the user. A user may then wish to edit the original query. Once the edit is complete, the user signals completion of the edited query, and the search engine searches for documents responsive to the edited query.

Because the original query and any subsequently edited query are each not sent to the search engine until the user has signaled that the query is complete, time passes while the user is finishing the full search query. It would be desirable to have a system and method of speeding up this process.

SUMMARY

Embodiments of the present invention, as disclosed in this document, overcome the limitations and disadvantages described above by providing methods, systems, and graphical user interfaces (GUIs) for providing query completion suggestions, such as query refinement candidates.

Some embodiments provide autocomplete suggestions which complete the term or terms being entered by the user. However, some autocompletion suggestions of this sort are less useful to users editing previously submitted queries because they suffer from the drawback that they try to provide prefix-completions of the term(s) being edited, instead of providing suitable refinements or alternations for the terms being edited within a query.

As such, in other embodiments, users who are editing/refining a previously issued query are provided with useful autocomplete suggestions that are contextually sensitive to the terms/phrases being edited. Thus, users can take advantage of unobtrusive query refinements without needing to complete a query refinement or even delete a term or phrase that they wish to replace.

One aspect is a computer-implemented method for providing query suggestions. The method is performed on a server system having one or more processors and memory storing one or more programs for execution by the one or more processors. An original query is received from a client. One or more segments in the original query are identified. An anchor segment is identified. The anchor segment is identified based on cursor placement within the original query. Also, zero or more remaining segments of the original query, excluding the anchor segment are identified. Then one or more sibling segments associated with the anchor segment are identified. The sibling segments are identified by the server system to be semantically distinct from anchor segment. Then one or more query refinement candidates are identified. A respective query refinement candidate includes a sibling segment in place of the anchor segment and includes the remaining segments, if any, of the original query. Then information including one or more of the query refinement candidates is sent to the client for presentation.

Another aspect is a server system comprising one or more processing processors (sometimes called CPU or processing units) for executing programs and memory storing the programs to be executed by the one or more processors. The programs include instructions to perform any of a number of embodiments of the aforementioned method of providing query suggestions.

Yet another aspect involves embodiments of a non-transitory computer readable storage medium storing one or more programs to be executed by one or more processors of a computer system. The programs include instructions to perform any of a number of embodiments of the aforementioned method of providing query suggestions.

This summary of disclosed embodiments is not comprehensive and is not intended to delineate the scope of the invention. Its sole purpose is to present a brief overview of some embodiments in a simplified form as a prelude to the more detailed description presented below.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIGS. 11A and 11B depict portions of an exemplary related queries database used in identifying query refinement candidates, in accordance with some embodiments.

FIG. 12 depicts a portion of an historical queries database used in ranking or filtering query refinement candidates, in accordance with some embodiments.

DESCRIPTION OF EMBODIMENTS

Reference will now be made in detail to embodiments, examples of which are illustrated in the accompanying drawings. In the following detailed description, numerous specific details are set forth in order to provide a thorough understanding of the described embodiments. However, it will be apparent to one of ordinary skill in the art that other embodiments may be practiced without these specific details. In other instances, well-known methods, procedures, components, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without changing the meaning of the description, so long as all of the first element are renamed consistently and all occurrences of the second element are renamed consistently. The first element and the second element are both elements, but they are not the same element.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," as well as the terms "includes" and/or "including" when used in this specification, specify the presence of stated features, steps, operations, elements, and/or components, but do not preclude the presence or addition of one or more others. As used herein, the term "if" may be construed to mean "when" or "upon" or "in response to," depending on the context.

Figure 1:
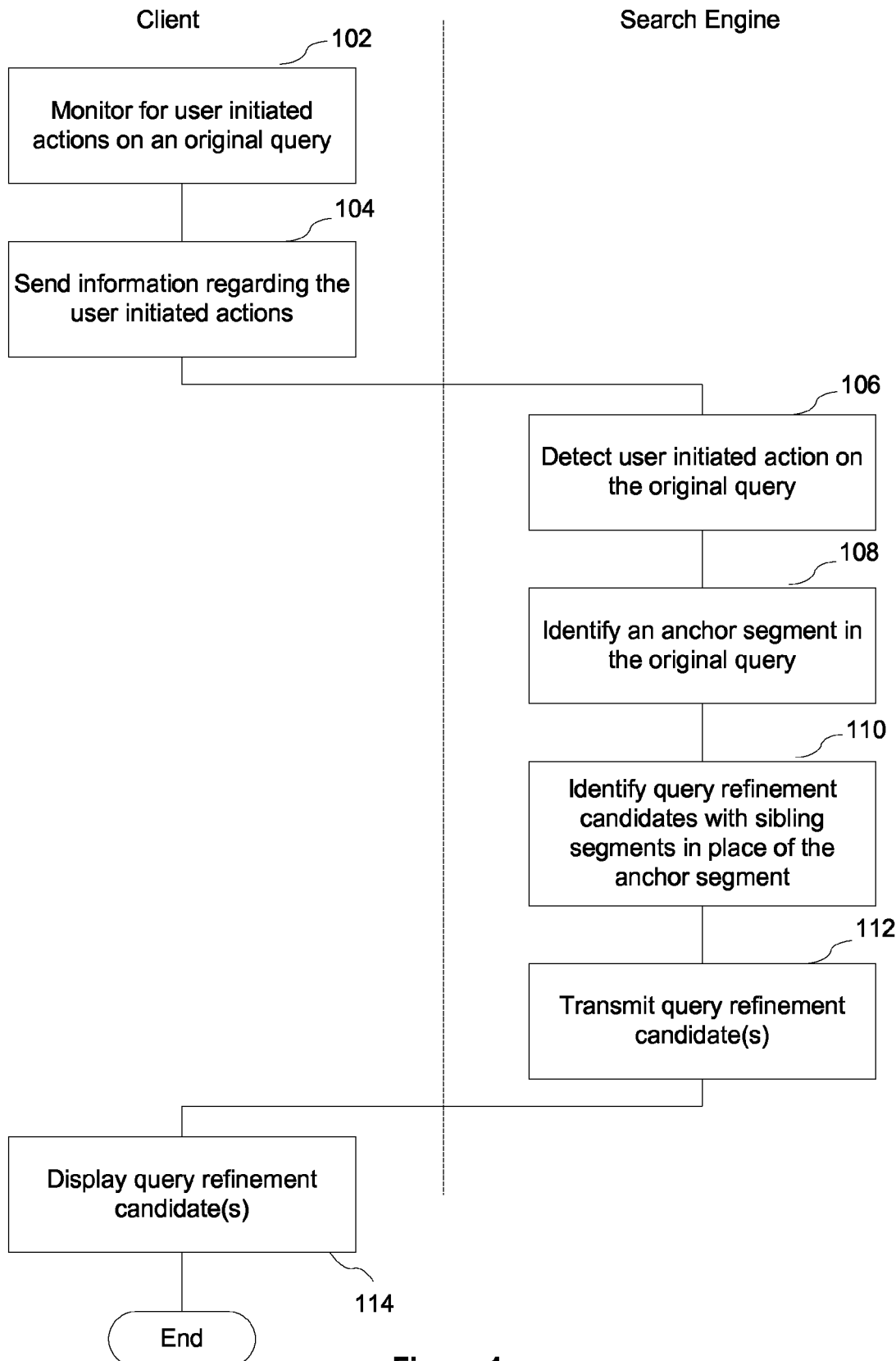
FIG. 1 presents an overview of a process for predicting query refinement candidates, in accordance with some embodiments.

FIG. 1 depicts a flow chart that provides an overview of a process for predicting queries refinement candidates in accordance with some embodiments. After a user has entered a search query and received initial search results at a client device or system (often herein called the client), the client monitors for user initiated actions on the original query (102). The user actions for which the client monitors include a variety of non-modifying user initiated actions such as highlighting, moving the cursor, or hovering the cursor over a portion of the original query, as will be explained in more detail herein. User initiated actions for which the client monitors also include deletions of one or more characters from the original query, and they may also include characters added to the original query. In some circumstances, and for ease of reference, the non-modifying user actions are called first user initiated actions or initial user actions, and the modifying user actions (additions and deletions) are called second user initiated actions.

The client sends information regarding the user initiated actions on the original query to the search engine (104). In some embodiments, when the user action is a non-modifying action, the information sent to the search engine (sometimes herein called the server or the server system) includes at least the cursor position and the original query. The search engine detects the user initiated action on the original query (106) by receiving the information sent to the search engine. Then the search engine identifies one or more segments including an anchor segment in the original query (108). For convenience, an anchor segment can be thought of as the segment of an original query that the user is deemed to be most likely to replace in a subsequent query. In some embodiments, the anchor segment is identified based on the position of the cursor. For example, if the original query contained three words, and the user moved the cursor to any portion of the second word, in some embodiments the search would identify the second word as the anchor segment. It should be noted that segments are not necessarily words, but can also be phrases or compound terms, as will be explained in more detail later. Once the anchor segment is identified, the search engine then identifies one or more query refinement candidates, wherein a respective query refinement candidate includes a sibling segment in place of the anchor segment (110). The query refinement candidates will also include any remaining segments of the original query (i.e., segments other than the anchor segment). The search engine uses a number of mechanisms, such as a database of refinements to the original query previously submitted by a community of users (described in more detail below) to assist in identifying the query refinement candidates. The query refinement candidates are ordered and or selected in accordance with one or more criteria. For example, in some embodiments queries having a higher frequency of submission, as determined from information obtained from a database of historical queries, are ordered for presentation before (e.g., above) queries having lower frequencies of submission. Then the server system transmits the query refinement candidate(s) to the client (112). The client displays the query refinement candidate(s) (114). If one of the query refinement candidates is what the user intended as the desired refinement to the original query, the user may select it and proceed without having to finish editing the original query. If the query refinement candidates do not reflect what the user had in mind, then the user may continue editing the original query. In some embodiments of this and other figures herein, operations shown as taking place on the server system will take place on the client and vice versa. For example, the detecting of the user initiated action on the original query (106) and the identifying of an anchor segment in the original query (108) are performed by the client in some embodiments. Furthermore, in some embodiments, one or more query refinement candidates may already be in the cache of the client (e.g. they may have been recent client queries) and therefore these query refinement candidates need not be transmitted from the server to the client.

Figure 14:
FIG. 14 is a schematic depiction of an exemplary screen shot of query refinement candidates displayed in a search results page, in accordance with some embodiments.

An exemplary client display of query refinement candidates is illustrated in FIG. 14. In this figure, the original query 1402 is "cancun hotels" and the search results 1404 displayed on this screen shot relate to the "cancun hotels" query. The search results may include advertisement search results, nearby places, star ratings, maps, reviews, and links to documents responsive to the original query. In this example the user has moved the cursor 1406 to a position adjacent to the "n" in cancun. Thus, the search engine identified "cancun" as the anchor segment. Query refinement candidates 1408 are displayed under the original query. Each query refinement candidate 1408 includes a sibling segment 1410 in place of the anchor segment. The sibling segments 1410 in this example are "playa del carmon," "riviera maya," "cabo," and "acapulco." The sibling segments are highlighted or otherwise distinguished to illustrate to the user that they are alternatives to "cancun." In this example, the original query included a remaining segment 1412 "hotels," and as such all of the query refinement candidates also include the remaining segment, "hotels."

Figure 2:
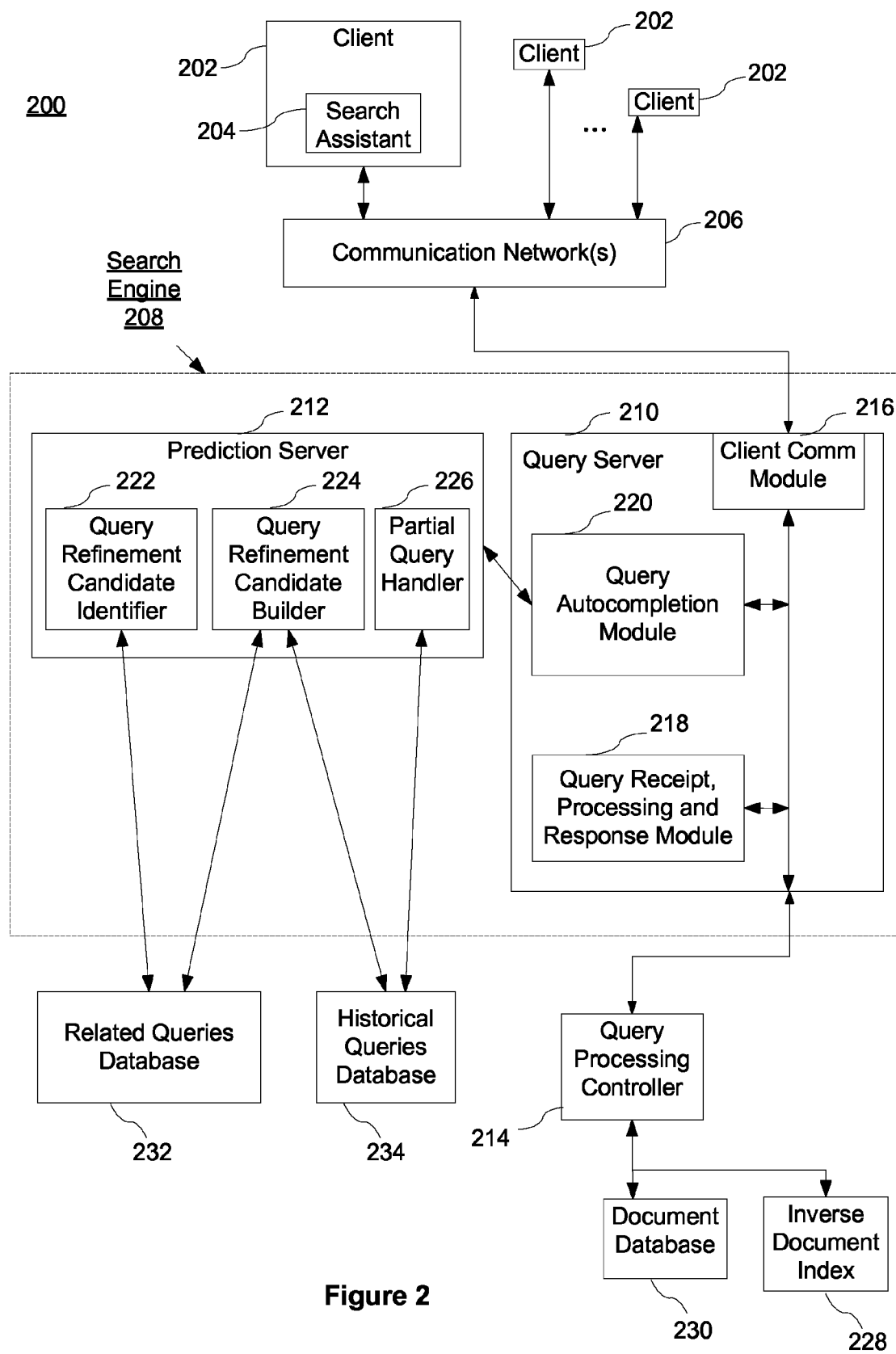
FIG. 2 is a block diagram of a search system, in accordance with some embodiments.

FIG. 2 is a block diagram of a search system 200 in accordance with some embodiments. It shows various functional components which will be referred to in the detailed discussion which follows. The search system 200 may include one or more client devices or systems 202, herein called client systems 202 for ease of reference. A respective client system 202 corresponds to the system whose operations are depicted on the left side of the flow chart in FIG. 1. A client system 202 optionally includes a search assistant 204. The client systems 202 are connected to a communications network 206, which connects the client systems 202 to a search engine 208. Search engine 208 includes a query server 210 connected to the communications network 206, a prediction server 212, a related queries database 232, a historical queries database 234, and a query processing controller 214.

In some implementations, query server 210 also includes a client communications module 216, a query receipt, processing and response module 218, and a query autocompletion module 220, which are all interconnected. In some embodiments, fewer and/or additional modules or functions are included in query server 210. The modules shown in FIG. 2 as being part of query server 210 represent functions performed in an exemplary embodiment. The prediction server 212 is connected to query autocompletion module 220, related queries database 232, and to historical queries database 234.

Prediction server 212 includes a partial query handler 226, which receives partially completed original queries and predicts query completion candidates using historical queries database 234. Prediction server 212 also includes a query refinement candidate identifier 222 which identifies query refinement candidates using information in related queries database 232. Prediction server 212 also includes a query refinement candidate builder 224, which forms query refinement candidates that include identified sibling segments. In some embodiments, query refinement candidate builder 224 identifies sibling segments by searching the related queries database 232, forms potential query refinement candidates using the sibling segments, and selects query refinement candidates for presentation based on popularity information in historical queries database 234. The process used by the query refinement candidate builder 224 will be explained in more detail with respect to FIGS. 5 and 6.

Query processing controller 214 is connected to an inverse document index 228 and a document database 230. The inverse document index 228 and document database 230 are sometimes collectively called the document database. In some embodiments, "searching the document database" means searching the inverse document index 228 to identify documents matching a specified search query or term. Query processing controller 214 handles the process of "executing" complete search queries and providing search results to be returned to a requesting client. In contrast, prediction server 212 handles two distinct tasks: producing suggested complete search queries in response to partial search queries received by the search engine, prior to user entry or selection of a complete search query; and producing suggested query refinements of a complete search query (herein called the original query) in response to user initiated actions on the original query. The suggestions produced by prediction server 212 can be thought of as "predictions" of the next search query that user intends to enter. When any of the suggestions produced by prediction server 212 is selected by the user, that is typically considered to be indicative that the prediction server was successful.

Although illustrated as discrete blocks in the figure, FIG. 2 is intended more as a functional description of some embodiments rather than a structural mapping of the functional elements. One of ordinary skill in the art would recognize that an actual implementation might have the functional elements grouped or split among various components.

Figure 3:
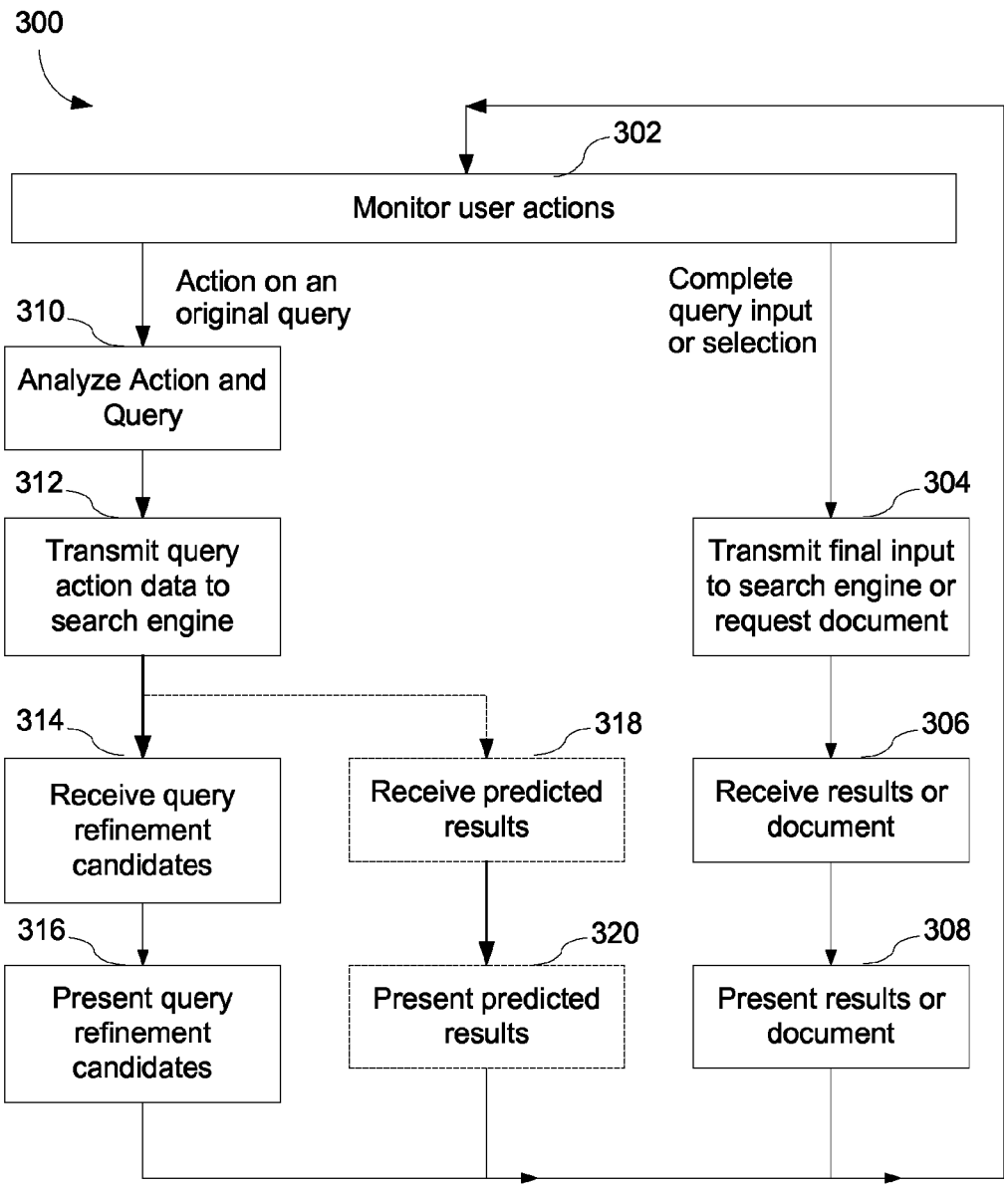
FIG. 3 includes a flow chart of a client side process (e.g., in a search assistant), in accordance with some embodiments.
Figure 10:
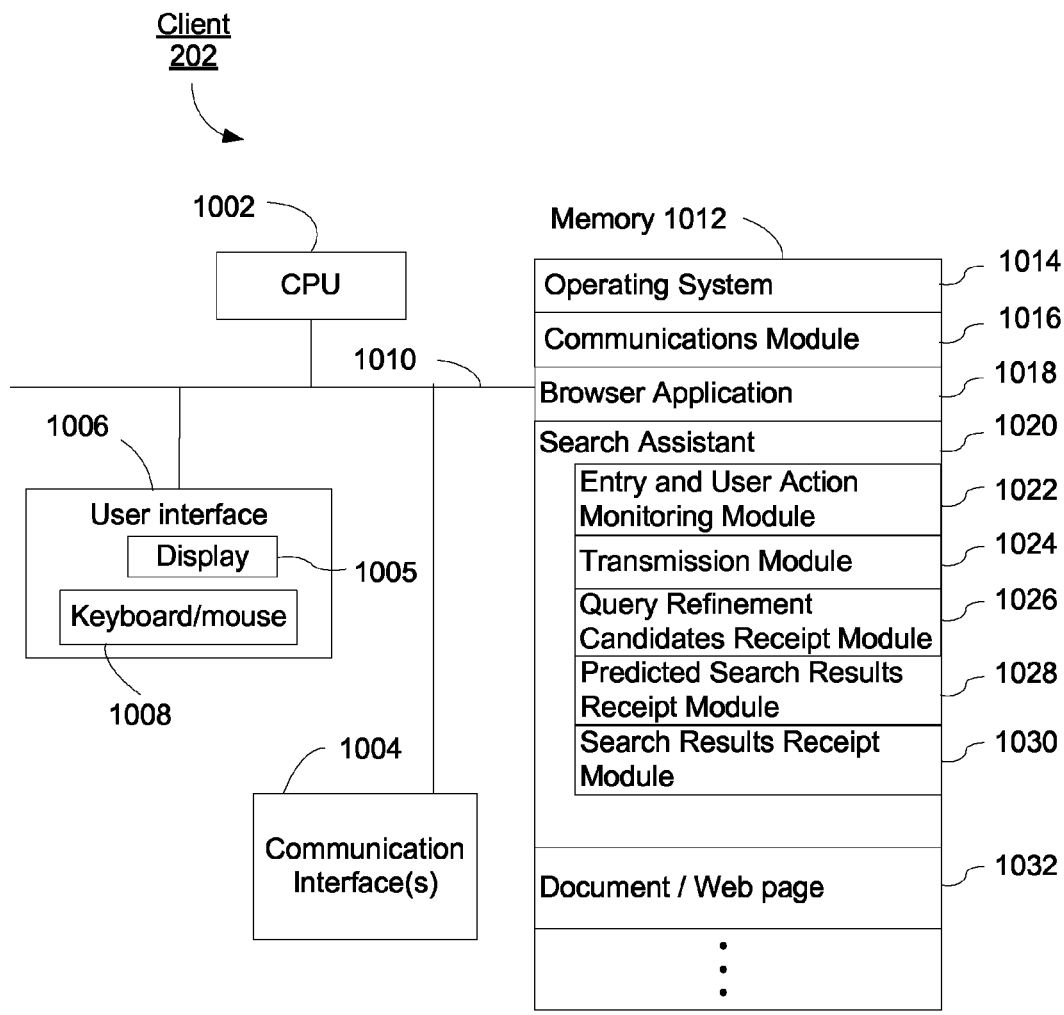
FIG. 10 is a block diagram of a client device or system, in accordance with some embodiments.

FIG. 3 includes a flow chart of a client side process 300, performed by a client system, such as client system 200 (sometimes herein simply called the client) shown in FIGS. 2 and 10, in accordance with some embodiments. Client side process 300 is optionally performed by a search assistant 204 (FIG. 2) in the client system. Search assistant 204 may be software embedded in a web page (e.g., a web page that includes a search box for entering a search query). Client side process 300 is associated with query refinement candidate selection and presentation. The client monitors user actions (302). User actions include input of an original query, selection of a query result, actions related to modifying an original query, or a selection of a query completion or query refinement candidate.

When the user action is entry or selection of a completed original query, which in some embodiments is indicated by the user hitting return or selection a "search" button, the client system transmits the complete query to the search engine (304). The search engine processes the complete query and returns search results responsive to the complete query. The client receives the search results (306), and presents the search results responsive to the complete original query (308).

When the user action is a user initiated action on the original query, including an action that does not modify the original query, the client analyses the action and the query (310). The client transmits corresponding query action data to the search engine (312). The client receives query refinement candidates (314), and presents (e.g., displays) the query refinement candidates (316). In some embodiments the query refinement candidates are presented within a search window as a pop-up window or drop down menu under the search box, as shown in FIG. 14. In some embodiments, the number of query refinement candidates displayed depends on the client. For example, fewer query refinement candidates are displayed on a mobile device than are displayed on a desktop device.

When the user action is a selection of one of the query refinement candidates, or query completion candidates, the selected query is transmitted to the search engine (304). The search engine processes the query and returns search results responsive to the selected query. The client receives the search results (306), and presents the search results responsive to the selected query refinement candidate (308).

In some embodiments, when the user action is a selection of a document in the search results, a request for that document is transmitted to the search engine (304). The search engine processes the request and returns the requested document. The client receives the document (306), and presents it (308). In some other implementations, when the user selects a document in the search results, an http request is sent to the server that hosts the document (304), which responds by sending the requested document to the client (assuming the requested document is still hosted by the server). The client receives the document (306), and presents it (308).

In some embodiments, when the client receives query refinement candidates (314), the client optionally additionally receives predicted results from the search engine (318). This activity overlaps with receiving the query refinement candidates (314) in that both sets of information are concurrently presented (316 and 320), as indicated by the dashed line to 318 in FIG. 3. The predicted results are presented (320) and the monitoring of user actions resumes (302). In some implementations, the predicted results correspond to documents or information that would have been returned based on the request being one of the query refinement candidates. For example, in some implementations, the results presented (320) may be one or more search results relevant to a highest ranked query refinement candidate. Accordingly, the client may present predicted results that match a desired query of the user before the user finishes editing the original query. In such situations, the processing latency as viewed by the user is effectively reduced to less than zero because the user did not have to complete the input to obtain the desired result.

Figure 4:
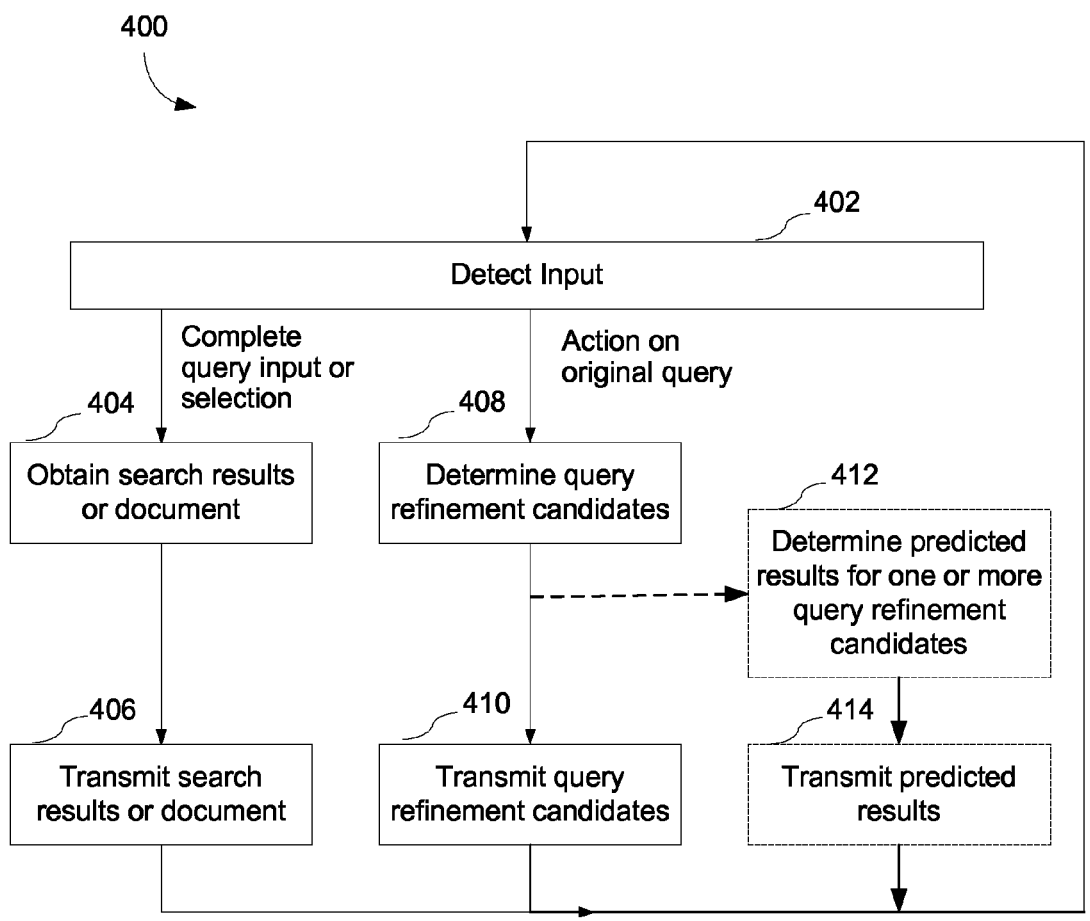
FIG. 4 includes a flow chart of a process, performed by a search engine system, for receiving query input, query selection, document selection, or actions on an original query and creating responses thereto, in accordance with some embodiments.
Figure 9:
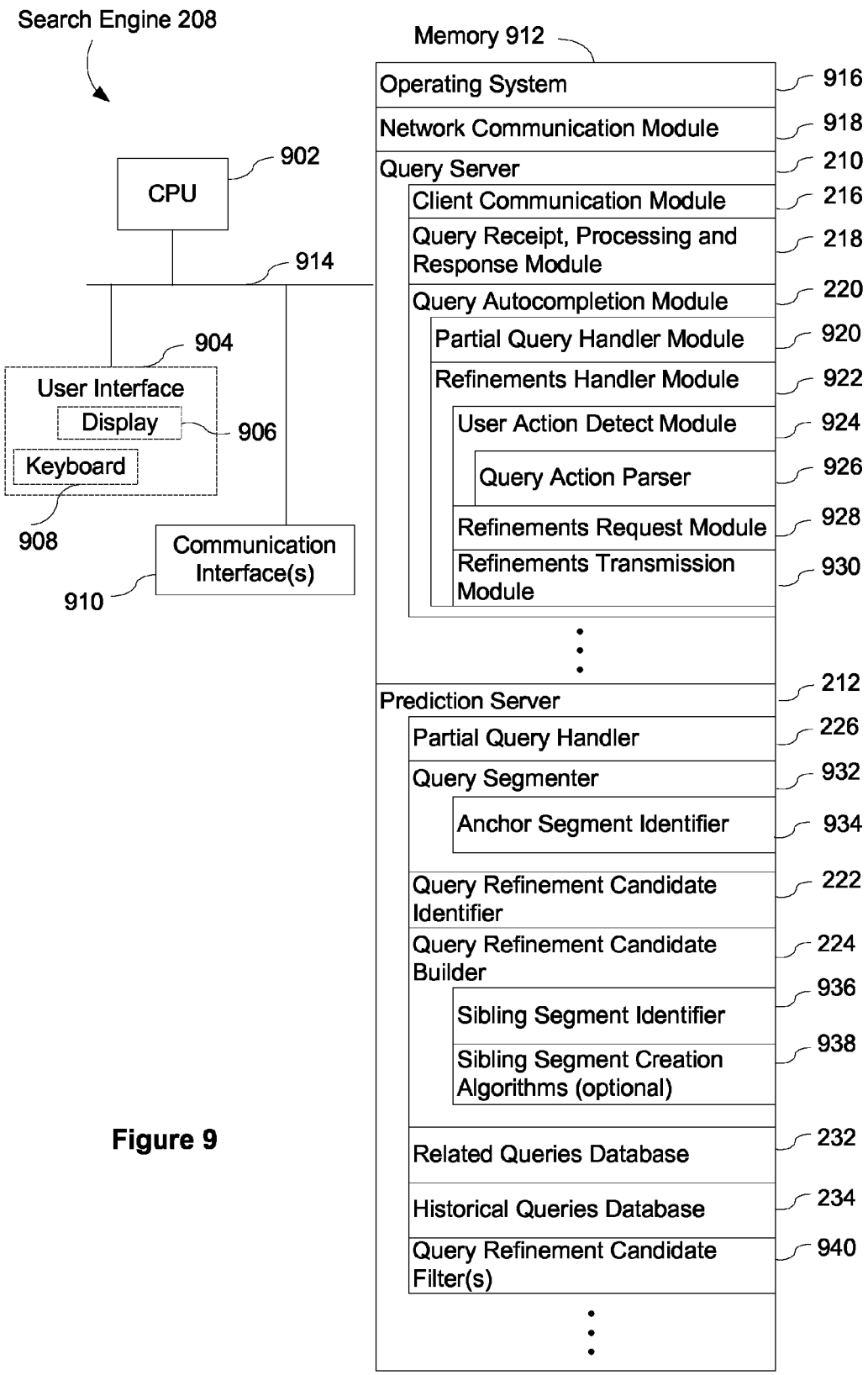
FIG. 9 is a block diagram of a search engine, in accordance with some embodiments.

FIG. 4 includes a flow chart of a process 400 (a search engine system side process) performed by a search engine, such as the search engine 208 depicted in FIGS. 2 and 9, for detecting query input, query selection, and actions on an original query, and creating responses thereto in accordance with some embodiments. The search engine system detects input (received from a client) (402). The input includes input of an original query, selection of a query result, actions related to modifying an original query, or a selection of a query completion candidate or query refinement candidates.

When the received or detected input is a completed original query or a selection or a query completion or refinement candidate, the search engine processes the query and obtains and sends corresponding search results responsive to the query (404). The search engine then transmits the search results to the client for presentation (406).

In some implementations, when the received input is a selection of a document in the search results, the search engine obtains the requested document (404). The search engine then transmits the requested document to the client (406). In some other implementations, not shown in FIG. 4, when the user selects a document in the search results, an http request is sent to the server that hosts the document, which responds to sending the requested document to the client (assuming the requested document is still hosted by the server).

When the received input is a user initiated action on the original query, including an action that does not modify the original query, the search engine determines query refinement candidates (408). The search engine then transmits the query refinement candidates to the client (410).

In some embodiments, in addition to determining query refinement candidates (408), the search engine system additionally determines search results (herein called predicted search results, to distinguish them from search results for a query the user has entered or selected) for one or more of the query completion or refinement candidates (412). The predicted search results are transmitted to the client (414). The predicted search results are the documents or information that would be returned to the client if the user were to select the corresponding (typically the topmost or highest ranked) suggested query completion or refinement candidate, as described with respect to FIG. 3.

Figure 5:
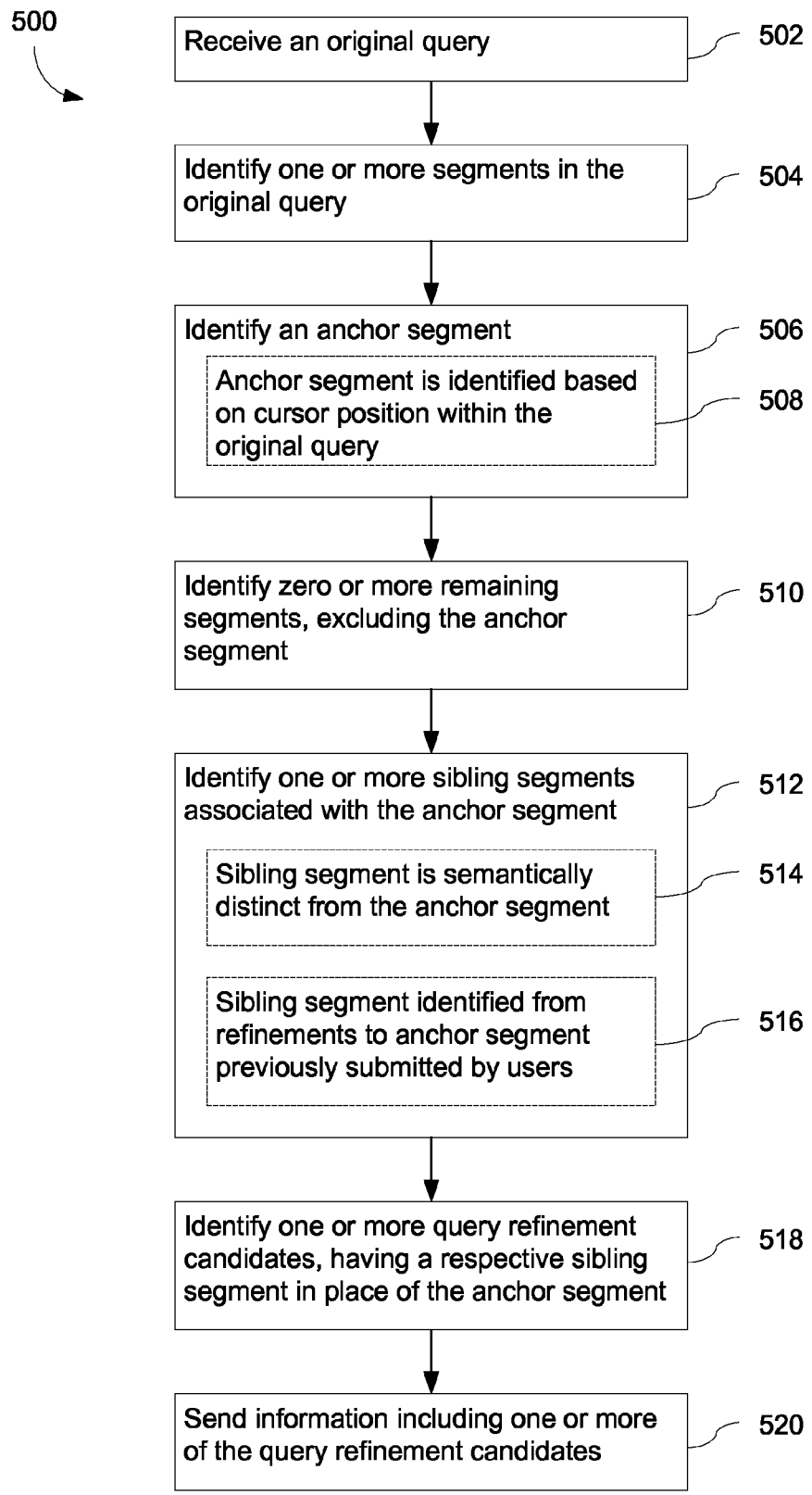
FIG. 5 includes a flow chart of a process for identifying query refinement candidates, in accordance with some embodiments.

FIG. 5 includes a flow chart of a method 500 for identifying query refinement candidates, in accordance with some embodiments. This is a method for suggesting query refinement candidates, which are similar to query completion candidates. Query completion candidates include predicted queries responsive to partially completed queries. Query refinement candidates are predicted refinements or alternatives to an original query (a query which has been previously submitted during the same search session). The method 500 is performed on a server system (e.g., the search engine 208 shown in FIGS. 2 and 9) having one or more processors and memory storing one or more programs for execution by the one or more processors to perform the method.

An original query is received from a client (502). The original query is processed and the search engine server system returns search query results responsive to the original query, as described with respect to FIG. 4.

One or more segments are identified in the original query (504). A segment is a word, a term, or group of words or terms used to identify a distinct concept. In some embodiments, a concept segmenter is used to identify one or more phrases, concepts, n-grams or compounds in the original query. Each identified phrase, concept, n-gram or compound refers to a respective single entity or concept, even if it contains more than one word. For example, in the query ["lord of the rings dvd release date"], the concept segmenter identifies "lord of the rings", "dvd" and "release date" as segments. Similarly, in the query ["new york times square"], the concept segmenter would identify "new york" and "times square" as two segments. In some implementations, the one or more segments are identified using techniques disclosed in U.S. patent application Ser. No. 13/094,794, "Generating Query Refinements," filed Apr. 26, 2011, which is hereby incorporated by reference in its entirety. In some embodiments, a concept segmenter produces concept scores associated with the identified segments. The concept scores are used to evaluate the identified segments. In some embodiments, the concept segmenter is used a second time to break multi-word segments into smaller segments. This second pass segmentation occurs in some embodiments when the concept score is determined to be inadequate, for example, when a multi-word segment score does not reach a predetermined threshold. In some embodiments, multi-word segments are broken down into smaller segments and then the smaller segment concept scores are compared to the multi-word concept score, and the segment(s) with higher concept score(s) are chosen to be the segments used for further processing.

After segmenting the original query, an anchor segment of the one or more segments in the original query is identified (506). Conceptually, an anchor segment is the segment of the original query that the user is deemed to be most likely to replace in a subsequent query, based on one or more actions taken by the user. In some embodiments, the anchor segment is identified based on cursor placement within the original query (508). For example, if a user has highlighted a particular segment, clicked on a particular segment, or moved a cursor to a particular segment, that particular segment is identified as the anchor segment. In some embodiments, a segment is identified as an anchor segment when the cursor position is within or directly adjacent to a word or term in the original query. In some embodiments, the anchor segment is identified in response to a user's initial non-modifying action, wherein the cursor is within or directly adjacent to a term in the original query. In other embodiments, a segment is determined to be the anchor segment if the server detects that one or more characters of the segment have been deleted.

The server system also identifies zero or more remaining segments of the original query, excluding the anchor segment (510). If the query includes only one term or one segment, then no remaining segments are identified. Otherwise, one or more remaining segments are identified.

Then, in some embodiments, one or more sibling segments associated with the anchor segment are identified (512). A sibling segment is a segment which will replace the anchor segment in the original query in order to create a query refinement candidate. Generally, a sibling segment is related to but conceptually distinct from the anchor segment. For example, a sibling segment may be an alternative or related term or phrase. In the example of FIG. 14, the sibling segments "playa del carmen," "cozumel," "riviera maya," "cabo," and "acapulco" are identified for the anchor segment "cancun."

In some embodiments, one or more of the sibling segments are semantically distinct from the anchor segment (514). In other embodiments, each of the sibling segments is semantically distinct from the anchor segment. Semantically distinct sibling segments are useful in that they are more likely to be conceptually different from the anchor segment. Semantically related sibling segments on the other hand are likely to produce similar results to those of the original query, which are unlikely to be desired by the user modifying the original query. In some embodiments, a stemming algorithm, such as the "porter stemming" algorithm is used to determine semantic distinctiveness, and semantically related segments are filtered out or otherwise removed. Thus, only semantically distinct sibling segments are identified.

In some embodiments, sibling segments are identified without regard to any characters in the anchor segment. For example, the anchor segment may begin with the letter "c," but the sibling segments are identified without regard to whether they begin with the letter "c" or not. In many circumstances, the sibling segment of at least one of the query refinement candidates has an initial character different from an initial character of the anchor segment.

In some embodiments, sibling segments are identified from refinements to an anchor segment previously submitted by users in a community of users (516). In some implementations, a refinement to an anchor segment previously submitted by a user in a community of users is a refinement submitted subsequently to and during a same online session a query including the anchor segment. In some embodiments, a related queries database 232, i.e., a database of subsequent queries or subsequent refinements submitted by users after submitting the original query is used to identify the sibling segments. For example, as shown in FIG. 11B, refinements to the term "apple," including "banana," "Google," "IBM," "strawberry," and "Golden Delicious," are stored in the related queries database 232 (sometimes herein called the query refinements database). As such, these five terms are identified as sibling segments when the related queries database is used to identify sibling segments for "apple."

One or more query refinement candidates are then identified (518). A respective query refinement candidate includes a respective sibling segment in place of the anchor segment. The one or more query refinement candidates also include the remaining segments, if any, of the original query. In some implementations or some circumstances, additional terms or segments are also included in one or more of the query refinement candidates. For example, in some implementations or circumstances, additional terms are added to the end of the queries.

Finally, the server search engine system sends information including one or more of the query refinement candidates to the client for presentation (520). The server system may also send other information such as search results for one or more of the query refinement candidates, advertisements, personalized search results, map data, or other data that is determined to be of potential interest to the user.

The above described process, as well as processes described below, can be used to provide contextually sensitive autocomplete suggestions to the user. If one of the query refinement candidates is what the user intended as the desired refinement to the original query, the user may select it and proceed without having to finish editing the original query. Thus, these methods are useful for speeding up a desired search by anticipating a user's request.

Figure 6:
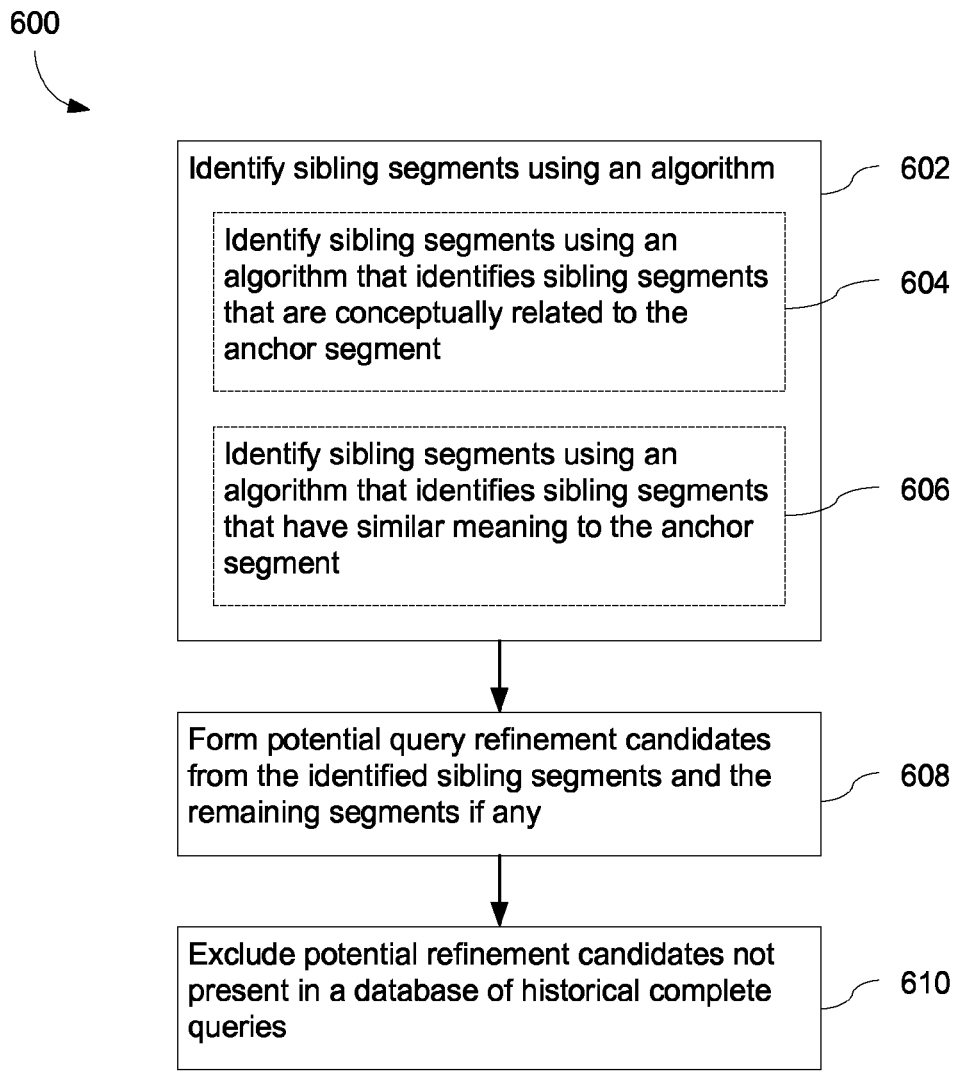
FIG. 6 includes a flow chart of a process for identifying query refinement candidates by identifying sibling segments, in accordance with some embodiments.

FIG. 6 includes a flow chart of a process 600 for identifying query refinement candidates by identifying sibling segments in accordance with some embodiments. In some embodiments, process 600 is performed by a server system (e.g., a search engine) having one or more processors and memory storing one or more programs for execution by the one or more processors of the server system so as to perform method 700, such as search engine 208 (see FIGS. 2 and 9). In some implementations, process 600 is performed by a prediction server 212 within a search engine (see FIGS. 2 and 9).

As described with reference to FIG. 5, in some embodiments, sibling segments are identified (516, FIG. 5) from refinements to an anchor segment previously submitted by users in a community of users (e.g., from a related queries database 232). In some circumstances, however, and in some implementations, one or more sibling segments are identified using one or more supplemental methods, sometimes called algorithms (602). For example, in some implementations, algorithms are used to identify sibling segments when not enough sibling segments are identified from the related queries database 232. For example, if the query refinement candidate identifier 222 is configured to identify at least N (e.g., 6, 8 or 10) sibling segments, and fewer than N 5 are identified from the related queries database, then the query refinement candidate builder 224 attempts to identify additional using one or more supplemental methods (algorithms).

In some implementations, one or more sibling segments are identified (e.g., by query refinement candidate builder 224) by one or more of the following supplemental methods: identifying one or more sibling segments that are conceptually related to the anchor segment (604); identifying one or more sibling segments that have similar meaning to the anchor segment (606); identifying one or more pairs of terms (one of which is the anchor segment, and the other being a candidate sibling segment) that occur in the same context, and/or that have terms used in a same search session, and/or that have parent queries in common; identifying one or more sibling segments by determining hyponyms of the anchor segment; identifying one or more sibling segments by determining hyperyms of the anchor segment; and/or identifying one or more sibling segments by determining candidate sibling segments that have category intersections with the anchor segment. In some implementations, one or more sibling segments are identified using techniques disclosed in U.S. patent application Ser. No. 13/094,794, "Generating Query Refinements," filed Apr. 26, 2011, which is hereby incorporated by reference in its entirety.

Once sibling segments are identified using one or more of the supplemental methods (602) or using refinements to an anchor segment previously submitted by users in a community of users (516), potential query refinement candidates are formed from the identified sibling segments (608). When the original query includes two or more segments (including the anchor segment and one or more remaining segments), potential query refinement candidates are formed from the identified sibling segments and the one or more remaining segments.

Then the server search engine system filters the potential query refinement candidates (610) in accordance with predefined criteria. In some embodiments, the server search engine system excludes one or more of the potential query refinement candidates not present in a predefined database of historical complete queries (608). For example, potential query refinement candidates not found in the historical queries database 234 are excluded. The excluding step is useful because not all of potential query refinement candidates formed from the sibling segments will be logical, useful, or valid complete queries. For example, referring to FIG. 11B, consider an original query of "Apple stock price," where "apple" is identified as the anchor segment and the sibling segments identified for the anchor term "apple" include "banana," "Google," "IBM," "strawberry," and "Golden Delicious." The formed potential refinement candidates include "banana stock price," "Google stock price," "IBM stock price," "strawberry stock price," and "Golden Delicious stock price." In this example, "banana stock price," "strawberry stock price," and "Golden Delicious stock price" would be excluded because they are not present in a predefined database of historical complete queries (e.g., the historical queries database 234). It should be noted, in some embodiments the historical queries database 234 only includes historical queries having occur rates or historical occurrences above a predetermined threshold. In some implementations, there are also additional restrictions on the queries included in the historical queries database 234 in accordance with one or predefined inclusion or exclusion criteria (e.g., queries containing blacklisted terms are not included, queries submitted by fewer than N distinct users are not included). As a result, rare queries, such as "banana stock price" would not be found in the database of historical complete queries (or would not be accessible). Restriction on the content of the historical queries database 234 is useful in making sure that no personally identifiable information is accidentally revealed when providing suggested queries or suggested query refinements. In some implementations, potential query refinement candidates are also excluded if they have not resulted in search result clicks (selections of presented search results) above a predefined threshold, which helps to avoid providing suggested query refinements that have historically been of little interest to users.

Figure 7:
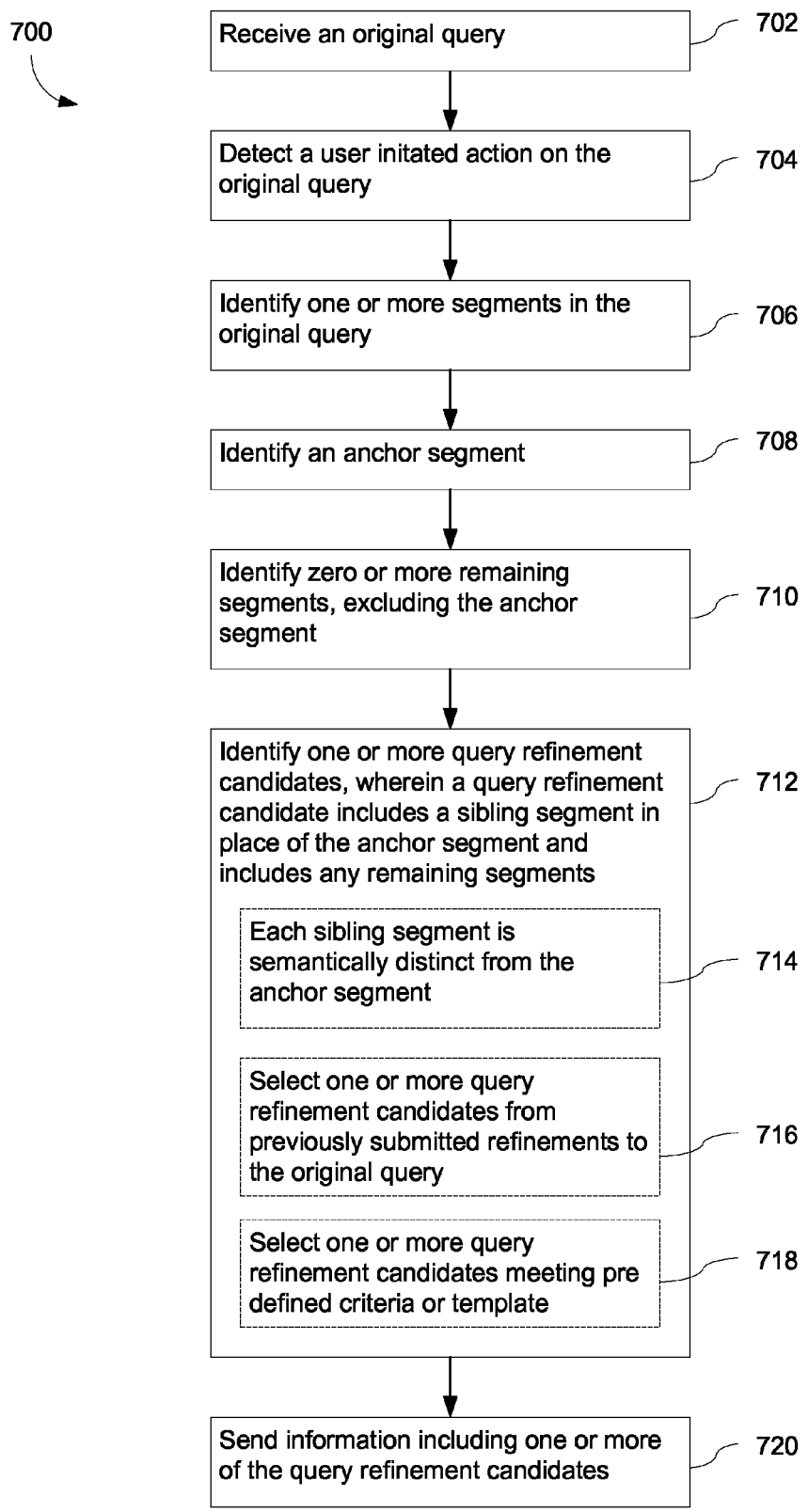
FIG. 7 includes a flow chart of another process for identifying query refinement candidates, in accordance with some embodiments.

FIG. 7 includes a flow chart of another process 700 for identifying query refinement candidates in accordance with some embodiments. In some embodiments, process 700 is performed by a server system (e.g., a search engine) having one or more processors and memory storing one or more programs for execution by the one or more processors of the server system so as to perform method 700, such as search engine 208 (see FIGS. 2 and 9). In some implementations, process 700 is performed by a prediction server 212 within a search engine (see FIGS. 2 and 9). This process 700 provides suggestions for query refinement candidates.

An original query is received from a client (702). The original query is processed and the search engine server system returns search query results responsive to the original query as described with respect to FIG. 4.

A user initiated action on the original query is detected (704). In some embodiments the detecting includes receiving information from the client regarding a user initiated action. In some embodiments, the detecting is performed by the client rather than by the server. In some circumstances, the user initiated action is one that does not modify the original query. For example, the user initiated action that does not modify the original query is an action selected from the group consisting of: moving a cursor position within the original query without modifying the original query, highlighting a portion of the original query without modifying the original query, and hovering a cursor or other pointing or selection entity (e.g., a user's finger, using a touch sensitive display or touchpad) over a portion of the original query. In some embodiments, detecting a user initiated action on the original query comprises detecting user cursor movement to a position within the original query other than a terminal position of the original query or hovering over a position within the original query other than the terminal position of the original query.

In response to detecting the user initiated action on the original query the following actions are performed. One or more segments are identified in the original query (706). A segment is a word, a term, or group of words or terms used to identify a concept, as described in more detail above with respect to FIG. 5. After segmenting the original query, an anchor segment of the one or more segments in the original query is identified (708). In some embodiments, the anchor segment is identified based on cursor placement within the original query, as described in more detail with respect to FIG. 5. The server system also identifies zero or more remaining segments of the original query, excluding the anchor segment (710).

Then one or more query refinement candidates are identified (712). A respective query refinement candidate includes a sibling segment in place of the anchor segment and includes the zero or more remaining segments of the original query. As explained with reference to FIG. 5, a sibling segment is a segment that will replace the anchor segment in the original query in order to create a query refinement candidate having a meaning different than the original query. Generally, a sibling segment is conceptually related to but distinct from the anchor segment. In some embodiments, each sibling segment is semantically distinct from the anchor segment (714).

It should be noted that when the original query includes two or more segments, identifying the zero or more remaining segments comprises identifying one or more remaining segments of the original query, excluding the anchor segment. Furthermore, identifying the one or more query refinement candidates comprises identifying respective query refinement candidates that each include the sibling segment in place of the anchor segment and also include the one or more remaining segments of the original query.

In some embodiments query refinement candidates are identified by forming potential query refinement candidates from sibling segments that are identified using one or more of the processes described with reference to FIGS. 5 and 6. A respective query refinement candidate is formed from an identified sibling segment and the zero or more remaining segments of the original query. Then potential query refinement candidates not found in the historical queries database 234 are excluded.

In other embodiments, identifying the one or more query refinement candidates includes selecting the one or more query refinement candidates from refinements to the original query submitted by users in a community of users (716). In some embodiments, a refinement to the original query submitted by a user in a community of users is a query submitted subsequently to and during a same online session as a query matching the original query. In some embodiments, a related queries database 232, i.e., a database of subsequent queries or subsequent refinements submitted by users after submitting the original query is used to identify the query refinement candidates. For example, as shown in FIG. 11A, refinements, i.e., queries submitted after the original query, for "Iceland hiking trails" include "Reykjavik hiking trails," "Denmark hiking trails," "Finland hiking trails," are stored in the related queries database 232. As such these queries may be identified as query refinement candidates. It should be noted that the query refinement candidates identified depend upon which term (or terms) has been identified as the anchor segment. For example, "Reykjavik hiking trails," "Denmark hiking trails," "Finland hiking trails," are query refinement candidates for the original query "Iceland hiking trails" when the anchor segment is "Iceland," whereas "Iceland map trails," "Iceland walking trails," and "Iceland outdoor trails" are query refinement candidates for the original query "Iceland hiking trails" when "hiking" is the anchor segment.

In some embodiments, identifying the one or more query refinement candidates includes selecting one or more of the query refinement candidates in accordance with one or more predefined criteria (718). In some embodiments, the query refinement candidates are selected that are consistent with a template (718), as will be described in more detail with respect to FIG. 8. In some embodiments, one or more decoupling techniques are used to ensure that the query refinement candidates are distinct from the anchor segment. In some embodiments, the query refinement candidates are selected that satisfy a semantic distinctiveness criterion. In some implementations, a stemming algorithm, such as the porter stemming algorithm, is used to determine semantic distinctiveness, and semantically related segments are filtered out or otherwise removed as described with respect to FIG. 5. For example, for the query "Iceland hiking trails," query refinement candidates would not include "Icelandic hiking trails" because "Icelandic" is not semantically distinct from "Iceland." In some embodiments, only semantically distinct subsequent queries are stored in the related queries database 232, while in other embodiments semantically related queries are removed (or not selected) from a set of potential query refinement candidates. In other embodiments, in addition to satisfying a semantic distinctiveness criterion, various other decoupling techniques are also employed. For example, in some embodiments, web result decoupling is also used. Web result decoupling compares web results of two queries to ensure that the queries produce at least a predefined quantity or proportion of distinct web results or distinct top web results (e.g., a criterion that at least X of the top Y search results are distinct). In some embodiments, web result decoupling is used alone, i.e., in place of the semantic distinctiveness criterion.

In some embodiments, identifying the one or more query refinement candidates includes selecting (718) one or more of the query refinement candidates in accordance with one or more predefined criteria selected from the group consisting of popularity criteria, relevance to original query criteria, user interest criteria, quality criteria, and filter-out criteria. In some implementations, selecting query refinement candidates comprises ranking the query refinement candidates based on one or more of the criteria listed above and selecting a subset of the ranked query refinement candidates as query refinement candidates based in part on the ranking. For example, in some embodiments the query refinement candidates are ranked based on popularity criteria, such as via query logs and click data, which in some embodiments is stored in the related queries database 232 and/or the historical queries database 234. Then a subset of the ranked query refinement candidates are selected as query refinement candidates based in part on the ranking.

In some embodiments, the selecting (718) further comprises selecting query refinement candidates that meet user interest criteria, such as user personalization information stored in a user profile, or alternatively stored in a short-term session profile that is based solely on user actions taken by the user during a current online session or one or more recent online sessions. In some embodiments, the query refinement candidates are ordered in accordance with personalization information, such as user personalization information or community information. For instance, user personalization information may include information about subjects, concepts or categories of information that are of interest to the user. In some implementations, user personalization information is provided directly by the user, or is inferred with the user's permission from the user's prior search or browsing activities, and/or is based at least in part on information about a group associated with the user or to which the user belongs (e.g., as a member, or as an employee). In some implementations, query refinement candidates are be initially ordered in accordance with a first ranking criteria, such as predefined popularity criteria, and then reordered if any of the query refinement candidates match the user personalization information of the user so as to place the personalized query refinement candidates (i.e., the query refinement candidates that match the user personalization information of the user) at or closer to the top of a list of query refinement candidates presented to the user.

In some embodiments, the selecting (718) further comprises selecting query refinement candidates that have been determined to produce search results meeting predefined criteria. In one example, the predefined criteria include one or more of: a requirement that the number of search results exceeds one predefined threshold, a requirement that at least one search result has a selection rate (when returned in response to the query) that is above a second predefined threshold, and/or a requirement that at least one search result has a PageRank (or any predefined query-independent metric of document importance) that exceeds a third predefined threshold.

In some embodiments, the selecting (718) further comprises not selecting query refinement candidates that are irrelevant to the original query in accordance with the predefined criteria for relevance to the original query. For example, as shown in FIG. 11A, one relatively popular query which is likely to be typed subsequent to "Iceland hiking trails" is "gmail." This is an example of a popular but irrelevant query refinement candidate. In some embodiments, popular but irrelevant query refinement candidates are removed if they fail a lift ratio test, which compares the likelihood of the query refinement candidate being input by a user after any prior query to the likelihood of the query refinement candidate being input by a user after this original query. If the ratio (e.g., the ratio of the likelihood of the query refinement candidate being input after this original query to the likelihood of the query refinement candidate being input after any query) is above a predefined threshold, then the subsequent query is considered relevant to the original query; if not, it is considered irrelevant.

In some embodiments, the selecting (718) further comprises not selecting query refinement candidates based on filter out criteria such as those candidates that are misspelled, contain information that is at least potentially personally identifiable, and/or contain one or more terms in a predefined set of offensive terms (sometimes called a blacklist). In some embodiments, misspelled terms are replaced with correctly spelled terms then included in the appropriate query refinement candidate. Optionally, the filter out criteria also filter out query refinements that do not use the same language as the original query and/or do not come from the same country as the original query.

Finally, the server search engine system sends information including one or more of the query refinement candidates to the client for presentation (720). The server system may also send other information such as search results for one or more of the query refinement candidates, advertisements, personalized search results, map data, or any other data which may be of interest to the user. When one or more of the optional selecting steps are performed (714-718) the one or more query refinement candidates sent to the client comprise the selected one or more query refinement candidates.

It should be noted that when the original query includes two or more segments, identifying the zero or more remaining segments comprises identifying one or more remaining segments of the original query, excluding the anchor segment. Furthermore, identifying the one or more query refinement candidates comprises identifying respective query refinement candidates that each include the sibling segment in place of the anchor segment and also include the one or more remaining segments of the original query.

Figure 8:
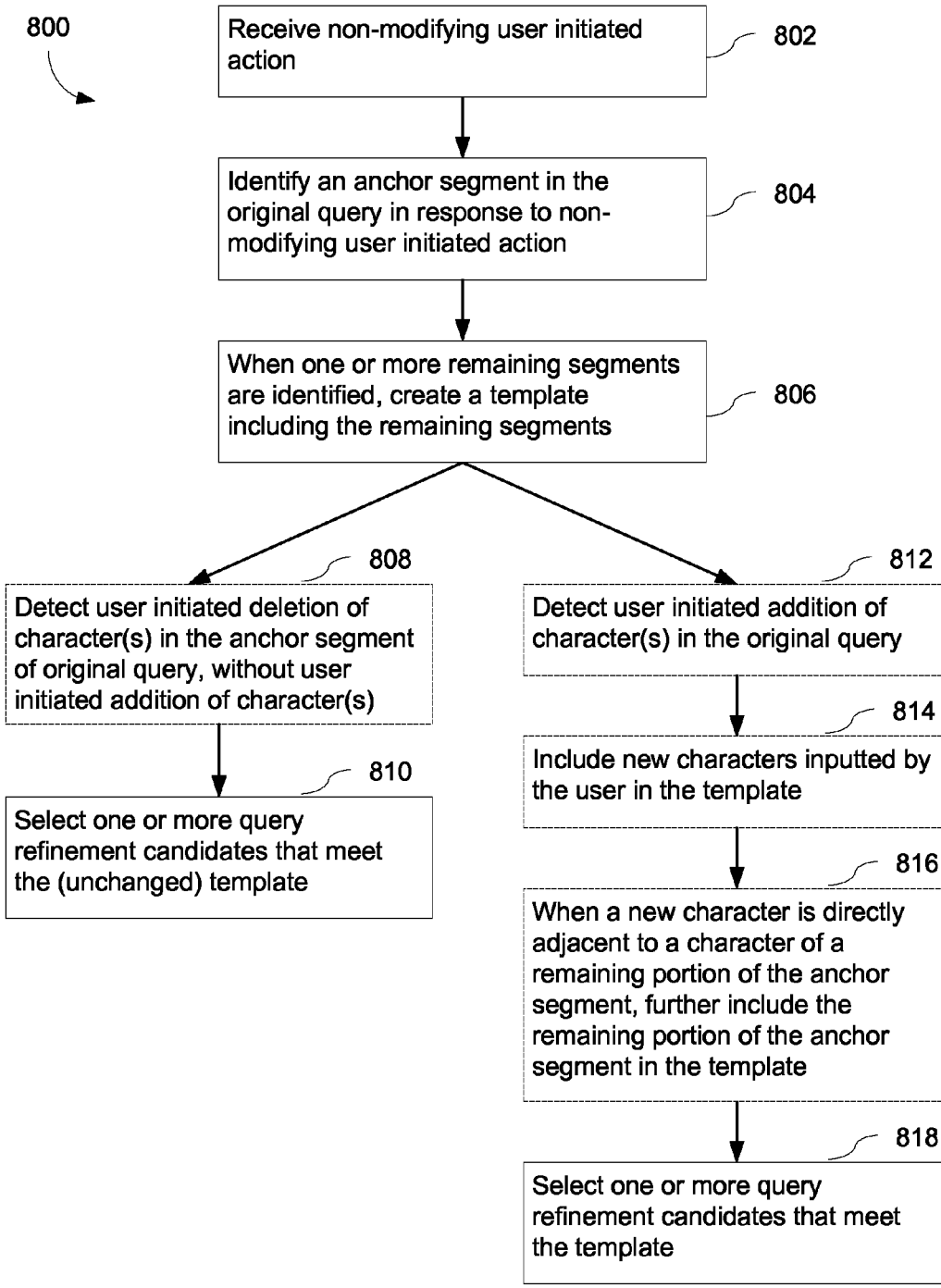
FIG. 8 includes a flow chart of a process of identifying query refinement candidates that conform to a template, in accordance with some embodiments.

FIG. 8 includes a flow chart of a process 800 of identifying query refinement candidates based meeting a template in accordance with some embodiments. In the context of the embodiments described here, the phrase "refinement candidates that meet a template" means "refinement candidates that are consistent with a template" or "refinement candidates that conform to a template." In some implementations, the process 800 is used in conjunction with one or more of the methods 500, 600, 700 previously described. In some embodiments, the non-modifying action, or first user initiated action is received (802). In response to the non-modifying user initiated action, one or more segments, including an anchor segment are identified (804). When the original query includes two or more segments, one or more remaining segments of the original query, excluding the anchor segment are also identified. These identifications of segments of the original query are explained in more depth with respect to FIGS. 5 and 7.

In some embodiments, a template is created which includes the one or more remaining segments of the original query (806). The anchor segment is not included in the template. Then, in some embodiments one or more query refinement candidates that meet the template are selected, e.g. FIG. 7 step (718).

In some embodiments, one or more second user initiated actions (modification actions) are received. The modifications include deletions and/or additions of characters to the original query. A character is a letter, numeral, ideograph, pictograph, or any other symbol used in a respective language.

In some implementations, when the user initiated action on the original query includes deletion of one or more characters from the anchor segment without adding any characters to the original query (808), the template is not changed. In this case, the template already did not include the anchor segment and a user initiated action that only deletes characters from the anchor segment does not provide additional information on which to select query refinement candidates. For example, if an original query was "Iceland hiking trails" and "Iceland" was determined to be the anchor segment, the template (e.g., template="* hiking trails", where "*" is a wildcard or placeholder that represents zero or more words or terms) includes "hiking" and "trails" and does not include "Iceland," and the detected deletion of "ice" from the original query would not affect the template.

One or more query refinement candidates are then selected which meet the template (810). As such, the identified one or more query refinement candidates do not change in response to detecting or receiving the deletions. Similarly, in embodiments that identify sibling segments before forming query refinement candidates, after an anchor segment has been identified, user initiated deletion of characters in the anchor segment does not affect the identification of the one or more sibling segments.

In some implementations, when the detected user initiated action on the original query includes a user initiated action on the original query that includes one or more characters inputted by the user (812) that are added by the user to the original query, the added characters are typically added to the anchor segment; however, in some implementations the added characters can include characters added to a remaining segment. Optionally, the user initiated action includes deletion on one or more portions of the anchor segment prior to and/or after adding characters to the anchor segment. For example, if the original query is "iceland hiking trails," the user initiated action may include deleting "ice" and then inputting/adding "gr" to create a partially edited query of "gr|land hiking trails" (wherein the "|" represents the current cursor position.) After detecting use input of additional characters, the template is modified to include the one or more new characters (814). The exact form of the modified template depends on what characters have been deleted (if any), which have been added, and the positions of deletions and additions. In the preceding example, the modified template may be represented as "gr*land hiking trails," where "*" is a wildcard or placeholder that represents zero or more characters. Alternatively, the modified template may be represented as "gr* hiking trails." Then one or more query refinement candidates are selected that meet the modified template (816). In some embodiments, when no remaining segments are identified, a template is not created until one or more new characters have been detected. Then the template is created which includes the one or more new characters.

In some embodiments, when the one or more new characters inputted by the user are directly adjacent to a character of the anchor segment (or a remaining portion of the anchor segment), the template includes the one or more new characters and the characters of the anchor segment (or remaining portion of the anchor segment). For example, with respect to the "gr|land hiking trails" modified query, where the identified anchor segment was "iceland" the modified template would include both "gr" and "land" as well as "hiking" and "trails" (see second example template provided above), whereas the template prior to receiving the added "g" and "r" characters (see first example template provided above) included only "hiking" and "trails" (but did not include "land").

In some embodiments, the search engine server system reconstructs the original query from various pieces of information provided by the client when reporting monitored user actions to the search engine server system (e.g., see 312, FIG. 3, and/or 402/"detect input: action on original query," FIG. 4). In some embodiments, the search engine server system receives from the client one or more deleted characters from the original query and any remaining characters from the original query. The remaining characters consist of characters of the original query which are not deleted characters. Then the original query is reconstructed from the deleted characters and the remaining characters. In some embodiments, added character information, if any, is also received, and if no characters have been added, a null value is recorded in the added characters field. In some embodiments, the cursor position is also received from the client. In some embodiments, when the cursor position is received, the word encompassing the cursor is broken into a prefix (pre cursor characters) and a suffix (post cursor characters).

In some implementations, the client action data sent to the search engine server system includes: A) the current text of the query, B) cursor position with the current text of the query, C) deleted text string(s), if any, and their positions, D) added text strings, if any, and their positions. Based on the current text of the query, the added text strings, and the cursor position in the client action data, the search engine server determines the state of the query prior to any text that was added (e.g., in the above example, the state of the query string was [|land hiking trails]). In addition, using the client action data, including the deleted text string(s), the search engine server determines the original query (e.g., in the above example, [Iceland hiking trails]).

In some embodiments, the client action data includes the number of added characters instead of the characters themselves for portion (D) of the client action data. Since the added characters are already included in portion (A) of the client action data, the search engine server has sufficient information from the client action data to identify the original query and the state of the query string prior to any new characters being added to the query string. For example, if a user enters [Iceland hiking trails], moves the cursor to a position immediately following the letter "e" and then deletes "ice" and adds "gr", the corresponding client action data in some embodiments would be (A) current text of query=[grland hiking trails], (B) cursor position=2, (C) deleted characters=ice, (D) added characters=2. From this client action data, the search engine server determines that the current state is [gr|land hiking trails].

Optionally, in some implementations, when the user has highlighted or otherwise selected a portion of the current query text, the cursor position information in the client action data sent to the search engine server system is replaced by or supplemented with highlighting/selection information. When present, the highlighting/selection information comprises, for example, start and end positions of the highlighting/selection within the current text of the search query. The client action data is used by the search engine server system to construct a template consistent with the user initiated action(s) on the original search query. Thus, for example, with the "gr|land hiking trails" modified query, the template would include a "gr" prefix and a "land" suffix as well as "hiking" and "trails." In some embodiments, highlighting information is also received from the client. From at least the deleted characters, remaining characters, added characters, and cursor position, the original query can be unambiguously identified (or recreated) by the search engine server system.

FIG. 9 depicts a search engine server system 208, in accordance with some embodiments. The search engine server system 208 typically includes one or more processor (sometimes called processing units or CPU's) 902, one or more network or other communications interfaces 910, memory 912, and one or more communication buses 914 for interconnecting these components. The communication buses 914 optionally include circuitry (sometimes called a chipset) that interconnects and controls communications between system components. The search engine server system 208 optionally includes (but typically does not include) a user interface 904, optionally comprising a display device 906 and a keyboard 908 or other input mechanism. Memory 912 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 912 optionally includes one or more storage devices remotely located from the one or more processors 902. Memory 912, or alternately the non-volatile memory device(s) within memory 912, comprises a non-transitory computer readable storage medium. In some embodiments, memory 912 or the computer readable storage medium of memory 912 stores the following programs, modules and data structures, or a subset thereof:

- an operating system 916 that includes procedures for handling various basic system services and for performing hardware dependent tasks;
- a network communication module 918 that is used for connecting the search engine server system 208 to other computers via the one or more communication interfaces 910 (wired or wireless) and one or more communication networks, such as the Internet, other wide area networks, local area networks, metropolitan area networks, and so on (see communication network 206, FIG. 2);
- a query server 210 for receiving full or partial queries and returning search results, documents, predicted queries completion candidates, predicted query refinement candidates, and predicted search results; and
- a prediction server 212 for receiving a partial query and returning a set of ordered query completion candidates or receiving information regarding a user initiated action on an original query and returning a set of ordered query refinement candidates.

In some embodiments, the query server 210 includes the following elements, or a subset of such elements: a client communications module 216 for receiving and transmitting information; a query receipt, processing and response module 218 for receiving and responding to full search queries either entered or selected from lists of query completion candidates or query refinement candidates; query autocompletion module 220 described in more detail below for receiving query completion candidates and query refinement candidates from the prediction server 212 and preparing them for presentation. In some embodiments, the query server 210 includes a subset of these modules. In some embodiments, the query server 210 includes additional modules.

The query autocompletion module 220 includes:

- a partial query handler module 920, which processes and passes partially completed original queries to the partial query handler 226, receives query completion candidates from the partial query handler 226, and prepares them for presentation; an example of a system that performs the functions of partial query handler 226 and/or partial query handler module 920 is disclosed in U.S. Pat. No. 7,487,145, "Method and System for Autocompletion Using Ranked Results," which is hereby incorporated by reference in its entirety;

a query refinement handler module 922 which handles the processing of user initiated actions on an original query and also prepares query completion candidates for presentation, including a user action detection module 924 which detects both user initiated actions that modify an original query and non-modifying user initiated actions, a query action parser 926 which determines what user actions have been performed and sends information regarding the user actions to the prediction server 212 (e.g., cursor position, highlighting information, any deleted characters, remaining characters, and any added characters), a refinements request module 928 which requests query refinement candidates from the query refinement candidate identifier 222 and/or the query refinement candidate builder 224, and the refinements transmission module 930 which prepares query completion candidates for presentation and transmits them to a requesting client.

In some embodiments, the prediction server 212 includes the following elements, or a subset of such elements:

- a partial query handler 226, which receives partially completed original queries from the partial query handler module 920 and predicts query completion candidates using the historical queries database 234; optionally, partial query handler 226 is combined with or integrated with partial query handler module 920;
- a query segmenter 932, which identifies one or more segments in the original query; in some implementations, segments in the original query are identified according to a concept segmentation algorithm;
- an anchor segment identifier 934, which identifies an anchor segment in the original query based on user actions including one or more of: cursor placement, highlighting, hovering, deletion of characters, and adding of characters; in some embodiments the anchor segment is identified in response to a user's non-modifying actions on the original query;
- a query refinement candidate identifier 222 which identifies query refinement candidates in the related queries database 232 that are consistent with the original query and identified anchor segment; in some implementations, query refinement candidate identifier 222 identifies query refinement candidates in response to a request from refinements request module 928;
- a query refinement candidate builder 224, which forms query refinement candidates based on identified sibling segments. Query refinement candidate builder 224 includes a sibling segment identifier 936, which identifies sibling segments from the related queries database 232, while the optional sibling segment creation algorithms 938 identify sibling segments having similar meaning to the anchor segment or sibling segments which are conceptually related to the anchor segment. Query refinement candidate builder 224 forms potential query refinement candidates using the identified sibling segments, and in some implementations selects query refinement candidates for presentation to the requesting user (by transmitting the candidates to the requesting client) based on popularity information in the historical queries database 234;
- a related queries database 232, which is a database of subsequent queries or subsequent query refinements submitted by users after submitting respective original queries; examples of data in related queries database 232 are shown and described with reference to FIGS. 11A and 11B; related queries database 232 optionally includes popularity information for each subsequent query or query refinement; and
- optionally, one or more query refinement candidate filters, such as a filter for removing query refinement candidates which have sibling segments that are not semantically distinct from the anchor segment, and also includes various other filters for removing or re-ordering the refinement candidates as discussed with respect to FIG. 7.

Each of the above identified elements may be stored in one or more of the previously mentioned memory devices of search engine 208, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 912 may store a subset of the modules and data structures identified above. Furthermore, memory 912 may store additional modules and data structures not described above.

Although FIG. 9 shows a "search engine server system 208," FIG. 9 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 9 could be implemented on single servers and single items could be implemented by one or more servers. The actual number of servers used to implement a search engine server system 208 and how features are allocated among them will vary from one implementation to another, and may depend in part on the amount of data traffic that the system must handle during peak usage periods as well as during average usage periods.

FIG. 10 depicts a client system 202, in accordance with some embodiments. The client system 202 typically includes one or more processing units (CPU's) 1002, one or more network or other communications interfaces 1004, memory 1012, and one or more communication buses 1010 for interconnecting these components. The communication buses 1010 optionally include circuitry (sometimes called a chipset) that interconnects and controls communications between system components. The client system 202 optionally includes (and typically does include) a user interface 1006 comprising a display device 1005 and a keyboard/mouse 1008 or other input mechanism. Memory 1012 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 1012 optionally includes one or more storage devices remotely located from the CPU(s) 1002. Memory 1012, or alternately the non-volatile memory device(s) within memory 1012, comprises a non-transitory computer readable storage medium. In some embodiments, memory 1012 or the computer readable storage medium of memory 1012 stores the following programs, modules and data structures, or a subset thereof:

- an operating system 1014 that includes procedures for handling various basic system services and for performing hardware dependent tasks;
- a communication module (or instructions) 1016 that is used for connecting the client system 202 to other computers via the one or more communications network interfaces 1004 (wired or wireless) and one or more communications networks, such as the Internet, other wide area networks, local area networks, metropolitan area networks, and so on; and a browser application 1018 for accessing documents, such as web pages, stored locally or remotely from client 202, and for receiving input search queries from a user of client 202 and for displaying search results;

a search assistant 1020; and a web page or other document 1032 that is rendered by browser application 1018 for presentation to a user of client 202 via user interface 1006.

In some embodiments, the search assistant 1020 is separate from the browser application 1018, while in other embodiments the search assistant is incorporated in the browser application 1018. For example, in some implementations, search assistant 1020 is implemented, at least in part, in a plug-in or other extension of browser application 1018. In some implementations, search assistant 1020 is implemented, at least in part, as instructions embedded in a web page, such as web page 1032, rendered by the browser application 1018.

In some implementations, search assistant 1020 includes the following elements, or a subset of such elements: an entry and user action monitoring module (or instructions) 1022 for monitoring the entry of search queries and user actions on search queries (e.g., modifying and/or non-modifying user actions) and selecting query information and user action information for transmission to the search engine; a transmission module (or instructions) 1024 for transmitting partial search queries, complete search queries, selected query completion candidates, selected query refinement candidates, and user action information to the search engine; a query refinements candidates receipt module (or instructions) 1026 for receiving query refinement candidates; a predicted search results receipt module (or instructions) 1028 for receiving predicted queries and preparing them for presentation to the user of client 202 (e.g., preparing them for rendering by browser application 1018 and presentation via user interface 1006); and a search results receipt module (or instructions) 1030 for receiving search results and preparing them for presentation to the user of client 202. The transmission of final (i.e., completed) queries, receiving search results for completed queries, and displaying such results is handled by browser application 1018, search assistant 1020, or a combination thereof.

Although illustrated in FIGS. 9 and 10 as distinct modules or components, the various modules or components may be located or co-located within either search engine server system 212 or client 2002. For example, in some embodiments, some portions or functions described above as belong to server 212 are instead implemented by client 202. For example, in some embodiments query completion tables for the most popular searches in the historical queries database 234 and portions of the related queries database 232 such as subsequent queries submitted by the user may be periodically downloaded to client 202, thereby providing fully client-based query completion candidates and query refinement candidates for at least some queries. Further, client 202 may merge (e.g., by interleaving) locally generated and remotely generated results for presentation to the user.

In addition, although some of the flow charts in the drawings illustrate a number of logical stages or operations in a particular order, stages or operations that are not order dependent may be reordered and other stages or operations may be combined or broken out. While some reordering or other groupings are specifically mentioned, others can be accomplished by those of ordinary skill in the art without requiring specific guidance, and so an exhaustive list of alternatives is not presented here. Moreover, it should be recognized that at least some of the stages or operations shown in the flow charts could be implemented in hardware, firmware, software or a combination thereof.

FIGS. 11A and 11B depict portions of an exemplary related queries database 232 used in identifying query refinement candidates and sibling segments, in accordance with some embodiments. When a user in a community of users enters an original search query 1102, any subsequently entered search query, entered during the same online session as the original search query, is stored in query log (not shown) with any personally identifiable information removed. The query log is periodically processed (e.g., once per day, or once per week) to generate a list of subsequent queries 1104 for each original query, and corresponding entries are generated for the related queries database 232. The query log is also periodically processed (e.g., once per day, or once per week) to produce data for historical queries database 234. In some embodiments, data regarding the frequency of submission 1106 of each subsequent search query is also stored in the related queries database 232 and/or historical queries database.

Sometimes the subsequently entered queries are refinements of the original query, where a single word or segment has been replaced with another word or segment. This replaced word or segment is the anchor segment. In some embodiments, the subsequent queries are organized in related queries database 232 by anchor segment 1108. As shown in FIG. 11A, "Reykjavik hiking trails" 1112, "Denmark hiking trails" 1114, "Finland hiking trails" 1116, and "world map hiking trails" 1118 are stored as subsequent queries for the original query "Iceland hiking trails" 1102, where "Iceland" 1110 is the anchor segment. Similarly, "Iceland map trails" 1122, "Iceland walking trails" 1124, "Iceland outdoor trails" 1126, and "Iceland backpacking trails" 1128 are query refinement candidates for the original query "Iceland hiking trails" 1102, where "hiking" 11120 is the anchor segment.

Since users tend to search for similar topics within a search session, the queries that are subsequently submitted are often conceptually related to the original query. Thus, using the related queries database 232 to identifying popular subsequently submitted queries is an advantageous way to identify queries refinement candidates which are contextually sensitive and useful suggestions for a user who wishes to modify an original query.

Query completion candidates for the given original query are selected by consistency with a template, as explained with reference to FIG. 8. The query completion candidates are also ranked and/or filtered. In some implementations, the ranking and/or filtering is in accordance with one or more of: the popularity of the query completion candidates in a predefined community of users, refinement rate, positive clicks, and/or other metrics. In addition, in some implementations, popular but irrelevant subsequent queries that are not filtered out using the template (e.g., when the original query contains only one segment) are removed using a lift calculation or ratio to determine if they are relevant to the original query, as explained above with respect to FIG. 7.

In some embodiments, only semantically distinct subsequent queries are stored in the related queries database 232, or semantically related subsequent queries are periodically removed from the related queries database 232. For example, in FIG. 11A the related query "icelandic hiking trails" is not included because "icelandic" is not semantically distinct from "iceland." In other embodiments, semantically related queries are stored in the related queries database 232, but they are removed (or not selected) from a set of potential query refinement candidates during a filtering/selection stage as explained with reference to FIG. 7.

The related queries database 232 stores original queries having a single segment as well as original queries having a plurality of segments. FIG. 11B illustrates a table of related queries associated with a single segment original query ("Apple") 1136. As shown in 11B, the list of subsequent queries 1104 indicates that users in the community of users have searched for both fruit related queries ("banana 138," "strawberry 1144," and "Golden Delicious") and company related queries ("Google 1140" and "IBM 1144") after the original query "Apple."

Lists of subsequent queries related to multi-segment original queries can be used to identify query refinement candidates. Lists of subsequent queries related to single segment original queries can be used to identify sibling segments (as well as query refinement candidates for single segment original queries). For example, if too few high quality query refinement candidates are identified from a list of subsequent queries related to a multi-segment original query, additional query refinement candidates can be built from identified sibling segments obtained from a list of subsequent queries related to single segment original query (when the single segment is the identified anchor segment.)

When a list of subsequent queries related to a single segment original query is used to identify sibling segments for a multi-segment original query, the identified sibling segments may be filtered for context as follows. Potential query refinement candidates are formed from the sibling segments and the remaining segments. Then potential query refinement candidates not found in the historical queries database 234, or that have frequencies/usage values below a predefined threshold, are excluded. For example, if an original query was "Apple stock price," where "apple" was identified as the anchor segment, the list of subsequent queries from FIG. 11B, would be used to identify sibling segments for the anchor term "apple" of both fruit related queries ("banana 138," "strawberry 1144," and "Golden Delicious") and company related queries ("Google 1140" and "IBM 1144"). The formed potential refinement candidates would then include "banana stock price," "Google stock price," "IBM stock price," "strawberry stock price," and "Golden Delicious stock price." Then, "banana stock price," "strawberry stock price," and "Golden Delicious stock price" are excluded if they are not present in the historical queries database 234 or if they have frequency or usage values below a predefined threshold.

FIG. 12 depicts a portion of an historical queries database 234 used in ranking or filtering query refinement candidates in accordance with some embodiments. The historical queries database 234 is also used by the partial query handler to predict query completion candidates for the partial queries by providing popular queries that begin with the same characters as the partial query. The historical queries database 234 stores a list of queries 1202 entered by users in a community of users. Data regarding the frequency of submission 1204 of each search query is also stored. In some embodiments, the historical queries database 234 only allows query results to be returned if they have a frequency of submission above a predetermined threshold. As such, very rare queries would not be accessible in the database of historical complete queries 234. For example, if the threshold was 100 submissions, then the query "banana stock price" 1216, which only has 89 submissions, would not be returned. Thus, the historical queries database 234 can be a useful tool in determining whether formed potential refinement candidates are popular enough to be good query refinement candidates. Not storing (or returning) very rare queries is also useful in making sure that personally identifiable information, such as very rare and personally specific query candidates, are not provided to "general users" as suggested query completions or suggested query refinements. (It is noted that such queries might be returned to the original authors of those queries as suggested queries or refinements, using mechanisms other than those discussed in this document.)

In some embodiments, the historical query database 234 only stores queries that have received search result clicks above a predefined threshold. Examples of queries stored in the historical queries database in order of popularity include "YouTube" 1206, "Amazon" 1208, "Apple stock price" 1210, "Denmark hiking trails" 1212, Iceland backpacking trails" 1214, and "banana stock price" 1216. It should be noted that the frequency of submission of queries in the historical queries database 234 are typically significantly higher than the frequency of submission of a query in the related queries database 232 because the historical queries database 234 stores the total frequency of submission of a query, rather than the frequency of submission of a query when if follows a particular original query.

Figure 13A:
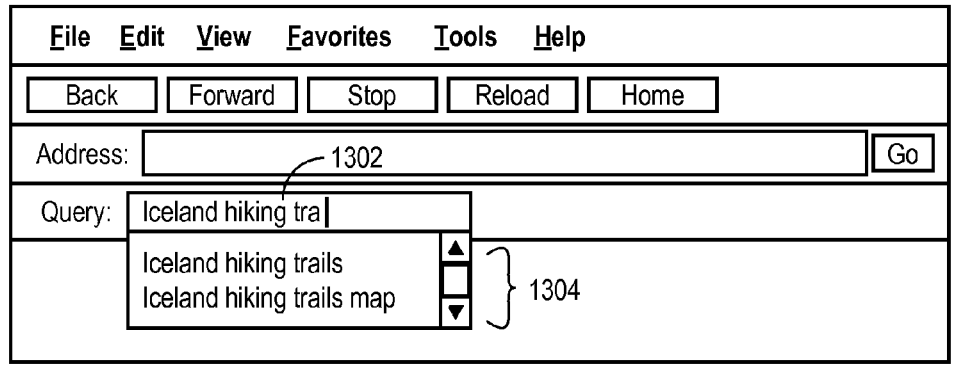
FIG. 13A depicts an example of query completion candidates, in accordance with some embodiments.

FIG. 13A depicts an example of a partially completed query 1302 ("Iceland hiking tra" and corresponding query completion candidates 1304 ("Iceland hiking trails" and "Iceland hiking trails map") in accordance with some embodiments. As explained above, the partial query handler 226 receives a partially completed original query 1302 and predicts query completion candidates 1304 from the historical queries database 234.

Figure 13B:
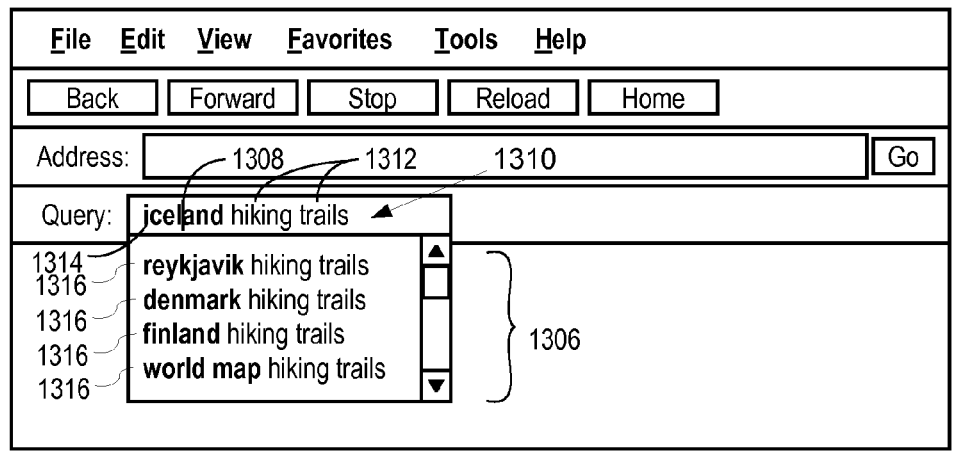
FIG. 13B depicts an example of query refinement candidates which depend on the placement of a cursor in an original query, in accordance with some embodiments.

FIG. 13B depicts an example of query refinement candidates 1306 in accordance with the placement of a cursor 1308 in an original query 1310, in accordance with some embodiments. In this example, the cursor 1308 is placed in the middle of "iceland." As a result, search engine server 208 identifies "iceland" as the anchor segment 1314 and determines that "hiking" and "trails" are remaining segments 1312. The query refinement candidates 1306 include various sibling segments 1316 in place of the anchor segment and also include the remaining segments 1312 of the original query. As shown in FIG. 13B, in some embodiments the sibling segments 1316 of the query refinement candidates 1316 are highlighted to help the user easily identify the changed portion of the queries. Highlighting in this context includes any form of distinguishing the sibling segment text from the rest of the query refinement candidate text including but not limited to bolding, italicizing, highlighting, using a different color, and using a different font.

Figure 13C:
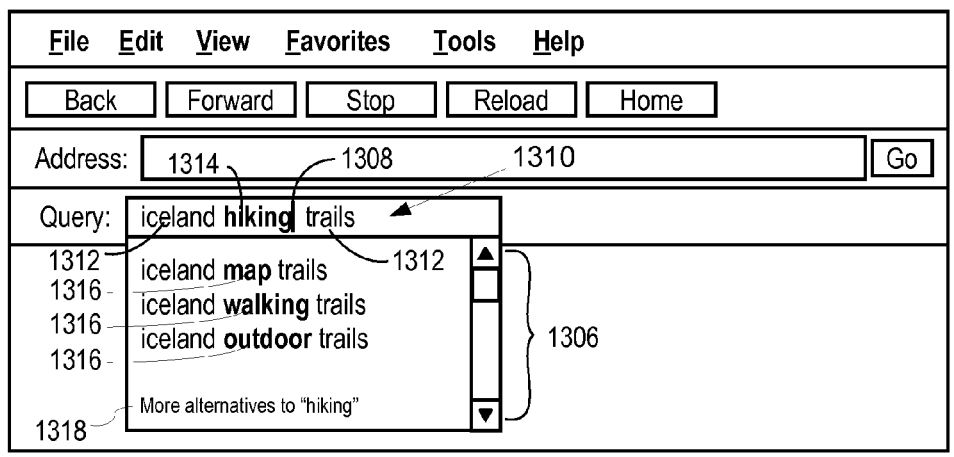
FIG. 13C depicts another example of query refinement candidates which depend on the placement of a cursor in an original query, in accordance with some embodiments.

FIG. 13C depicts another example of query refinement candidates 1306 in accordance with the placement of a cursor 1308 in an original query 1310, in accordance with some embodiments. In this embodiment, the cursor 1308 is placed adjacent to the term "hiking," which causes search engine server 208 to identify "hiking" as the anchor segment 1314 and to determine that "iceland" and "trails" are remaining segments 1312. The query refinement candidates 1306 include various sibling segments 1316 in place of the anchor segment and also include the remaining segments 1312 of the original query. FIG. 13C also illustrates an optional "more" link 1318, which provides access to additional query refinement candidates associated with the identified anchor term. In FIG. 13C, the "more" link provides "more alternatives to 'hiking' "

As can be seen from FIGS. 13B and 13C, as the user moves the cursor from segment to segment in the original query (via mouse click, mouse over, arrow keys, etc) the query completion candidates are updated accordingly. This occurs even when the user's actions do not modify the original query. Thus, the user can take advantage of unobtrusive query refinement suggestions displayed conveniently near the original query. Furthermore, the user can refine searches more quickly because the user need not type complete refined queries.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for query suggestion, performed on a server system having one or more processors and memory storing one or more programs for execution by the one or more processors to perform the method, comprising:
at the server system:
receiving an original query from a client distinct from the server system;
identifying one or more segments in the original query;
identifying an anchor segment of the one or more segments in the original query, wherein the anchor segment is identified based on cursor placement within the original query, and identifying zero or more remaining segments of the original query, excluding the anchor segment;
identifying one or more sibling segments associated with the anchor segment, wherein the one or more sibling segments are identified by the server system to be semantically distinct from anchor segment;
identifying one or more query refinement candidates, wherein a respective query refinement candidate includes a respective sibling segment in place of the anchor segment and includes the remaining segments, if any, of the original query;
sending to the client for presentation information including one or more of the query refinement candidates;
receiving from the client one or more deleted characters from the original query and any remaining characters from the original query, the remaining characters consisting of characters of the original query which are not deleted characters; and
reconstructing the original query from the deleted characters and the remaining characters;
wherein the one or more sibling segments are identified using an algorithm that identifies sibling segments that are conceptually related to the anchor segment; and
wherein, when the original query includes two or more segments, including the anchor segment and one or more remaining segments, identifying the one or more query refinement candidates comprises:
forming potential query refinement candidates from the identified sibling segments and the one or more remaining segments; and
excluding from the identified one or more query refinement candidates any of the potential refinement candidates not present in a predefined database of historical complete queries.

2. The method of claim 1, wherein a segment is identified as an anchor segment when the cursor position is within or directly adjacent to a word in the segment without modifying the original query.

3. The method of claim 1, wherein after an anchor segment has been identified, user initiated deletion of characters in the anchor segment does not affect the identification of the one or more sibling segments.

4. The method of claim 1, wherein the sibling segment is identified without regard to any characters in the anchor segment.

5. The method of claim 1, wherein the one or more sibling segments are identified from refinements to the anchor segment submitted by a user in a community of users.

6. The method of claim 1, wherein the one or more sibling segments are identified using an algorithm that identifies sibling segments that are conceptually related to the anchor segment.

7. The method of claim 1, wherein the one or more sibling segments are identified using an algorithm that identifies sibling segments that have similar meaning to the anchor segment.

8. The method of claim 1, wherein the one or more sibling segments are identified using an algorithm that identifies sibling segments that have similar meaning to the anchor segment; and
wherein, when the original query includes two or more segments, including the anchor segment and one or more remaining segments, identifying the one or more query refinement candidates comprises:
forming potential query refinement candidates from the identified sibling segments and the one or more remaining segments; and
excluding from the identified one or more query refinement candidates any of the potential query refinement candidates not present in a predefined database of historical complete queries.

9. The method of claim 1, further comprising:
when the original query includes two or more segments,
identifying one or more remaining segments of the original query, excluding the anchor segment;
creating a template including the one or more remaining segments of the original query and a placeholder corresponding to the anchor segment; and
selecting one or more query refinement candidates in accordance with a requirement that the one or more query refinement candidates meet the template.

10. The method of claim 1, further comprising:
receiving from the client, one or more new characters inputted by the user;
creating a template including the zero or more remaining segments of the original query, and further including the one or more new characters; and
selecting one or more query refinement candidates that meet the template.

11. The method of claim 10, wherein when the one or more new characters inputted by the user are directly adjacent to a character of a remaining portion of the anchor segment, the template includes a revised segment comprising the remaining portion of the anchor segment and the adjacent one or more new characters.

12. The method of claim 1, further comprising, prior to the sending, selecting one or more of the query refinement candidates in accordance with one or more predefined criteria selected from the group consisting of popularity criteria, relevance to original query criteria, user interest criteria, quality criteria, and filter-out criteria;

wherein the one or more query refinement candidates sent to the client comprise the selected one or more query refinement candidates.

13. The method of claim 12, wherein selecting query refinement candidates comprises:
ranking the query refinement candidates based on popularity criteria; and
selecting a subset of the ranked query refinement candidates as query refinement candidates based in part the ranking.

14. The method of claim 13, wherein the selecting further comprises not selecting query refinement candidates that are irrelevant to the original query in accordance with the predefined criteria for relevance to original query.

15. The method of claim 12, wherein the selecting further comprises not selecting query refinement candidates that are misspelled, contain information that is at least potentially personally identifiable, or contain one or more terms in a predefined set of offensive terms.

16. The method of claim 1, further comprising:
when the original query includes two or more segments,
identifying the zero or more remaining segments comprises identifying one or more remaining segments of the original query, excluding the anchor segment; and
identifying the one or more query refinement candidates comprises identifying respective query refinement candidates that each include the sibling segment in place of the anchor segment and also includes the one or more remaining segments of the original query.

17. A server system, for query suggestion, comprising:
one or more processors; and
memory storing one or more programs to be executed by the one or more processors;
the one or more programs comprising instructions for:
receiving an original query from a client distinct from the server system;
identifying one or more segments in the original query;
identifying an anchor segment of the one or more segments in the original query, wherein the anchor segment is identified based on cursor placement within the original query, and identifying zero or more remaining segments of the original query, excluding the anchor segment;
identifying one or more sibling segments associated with the anchor segment, wherein the one or more sibling segments are identified by the server system to be semantically distinct from anchor segment;
identifying one or more query refinement candidates, wherein a respective query refinement candidate includes a respective sibling segment in place of the anchor segment and includes the remaining segments, if any, of the original query;
sending to the client for presentation information including one or more of the query refinement candidates;
receiving from the client one or more deleted characters from the original query and any remaining characters from the original query, the remaining characters consisting of characters of the original query which are not deleted characters; and
reconstructing the original query from the deleted characters and the remaining characters;
wherein the one or more sibling segments are identified using an algorithm that identifies sibling segments that are conceptually related to the anchor segment; and
wherein, when the original query includes two or more segments, including the anchor segment and one or more remaining segments, identifying the one or more query refinement candidates comprises:
forming potential query refinement candidates from the identified sibling segments and the one or more remaining segments; and
excluding from the identified one or more query refinement candidates any of the potential refinement candidates not present in a predefined database of historical complete queries.

18. The server system of claim 17, wherein the sibling segment is identified without regard to any characters in the anchor segment.

19. The server system of claim 17, wherein the one or more programs further comprise instructions for:
receiving from the client, one or more new characters inputted by the user;
creating a template including the zero or more remaining segments of the original query, and further including the one or more new characters; and
selecting one or more query refinement candidates that meet the template.

20. The server system of claim 19, wherein when the one or more new characters inputted by the user are directly adjacent to a character of a remaining portion of the anchor segment, the template includes a revised segment comprising the remaining portion of the anchor segment and the adjacent one or more new characters.

21. A non-transitory computer readable storage medium storing one or more programs configured for execution by a computer, the one or more programs comprising instructions for:
at a server system:
receiving an original query from a client distinct from the server system;
identifying one or more segments in the original query;
identifying an anchor segment of the one or more segments in the original query, wherein the anchor segment is identified based on cursor placement within the original query, and identifying zero or more remaining segments of the original query, excluding the anchor segment;
identifying one or more sibling segments associated with the anchor segment, wherein the one or more sibling segments are identified by the server system to be semantically distinct from anchor segment;
identifying one or more query refinement candidates, wherein a respective query refinement candidate includes a respective sibling segment in place of the anchor segment and includes the remaining segments, if any, of the original query;
sending to the client for presentation information including one or more of the query refinement candidates;
receiving from the client one or more deleted characters from the original query and any remaining characters from the original query, the remaining characters consisting of characters of the original query which are not deleted characters; and
reconstructing the original query from the deleted characters and the remaining characters;
wherein the one or more sibling segments are identified using an algorithm that identifies sibling segments that are conceptually related to the anchor segment; and
wherein, when the original query includes two or more segments, including the anchor segment and one or more remaining segments, identifying the one or more query refinement candidates comprises:

forming potential query refinement candidates from the identified sibling segments and the one or more remaining segments; and excluding from the identified one or more query refinement candidates any of the potential refinement candidates not present in a predefined database of historical complete queries.

22. The non-transitory computer readable storage medium of claim 21, wherein the sibling segment is identified without regard to any characters in the anchor segment.

23. The non-transitory computer readable storage medium of claim 21, wherein the one or more programs further comprise instructions for:

receiving from the client, one or more new characters inputted by the user;

creating a template including the zero or more remaining segments of the original query, and further including the one or more new characters; and selecting one or more query refinement candidates that meet the template.

24. The non-transitory computer readable storage medium of claim 23, wherein when the one or more new characters inputted by the user are directly adjacent to a character of a remaining portion of the anchor segment, the template includes a revised segment comprising the remaining portion of the anchor segment and the adjacent one or more new characters.

* * * * *